United States Patent
Suzuki

(10) Patent No.: US 9,374,172 B2
(45) Date of Patent: Jun. 21, 2016

(54) OPTICAL RECEIVER, OPTICAL RECEPTION DEVICE, AND CORRECTION METHOD FOR OPTICAL RECEIVED INTENSITY

(75) Inventor: Yasuyuki Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 689 days.

(21) Appl. No.: 13/641,822

(22) PCT Filed: Apr. 15, 2011

(86) PCT No.: PCT/JP2011/059881
§ 371 (c)(1),
(2), (4) Date: Oct. 17, 2012

(87) PCT Pub. No.: WO2011/132759
PCT Pub. Date: Oct. 27, 2011

(65) Prior Publication Data
US 2013/0028596 A1 Jan. 31, 2013

(30) Foreign Application Priority Data
Apr. 21, 2010 (JP) ................................. 2010-097624

(51) Int. Cl.
*H04B 10/06* (2006.01)
*H04B 10/08* (2006.01)
*H04B 10/69* (2013.01)

(52) U.S. Cl.
CPC .................. *H04B 10/6931* (2013.01)

(58) Field of Classification Search
CPC ..................................................... H04B 10/677
See application file for complete search history.

(56) References Cited

U.S. PATENT DOCUMENTS 5,907,422 A * 5/1999 Ho ..................... H04B 10/6931
250/214 A
8,320,779 B2 * 11/2012 Fukuchi ................. H04B 10/66
398/158

(Continued)

FOREIGN PATENT DOCUMENTS

WO 2009/069814 A1 6/2009
WO 2010/041334 A1 4/2010

OTHER PUBLICATIONS

Chikuma, T.; Shiba, K.; Makita, K.; Suzuki, Y.; Ohami, T.; Baba, N., "43-Gb/s differential receiver module for RZ-DPSK," Optical Communication, 2008. ECOC 2008. 34th European Conference on, vol., No., pp. 1,2, Sep. 21-25, 2008.*

*Primary Examiner* — Ken N Vanderpuye
*Assistant Examiner* — Amritbir Sandhu
(74) *Attorney, Agent, or Firm* — Sughrue Mion, PLLC

(57) ABSTRACT

In the optical receiver available for the RZ-DPSK modulation system, the difference in the received intensity due to the difference in the intensity or optical path of the optical signal cannot be corrected automatically, therefore, an optical receiver according to an exemplary aspect of the invention includes a first photodiode receiving a normal phase optical signal from a first output of a 1-bit delayed interferometer and outputting a positive signal; a second photodiode receiving a reversed phase optical signal from a second output of the 1-bit delayed interferometer and outputting a complementary signal; a differential transimpedance amplifier inputting the positive signal and the complementary signal and including a closed feedback loop for each input of the positive signal and the complementary signal; a level adjustment unit adjusting a signal level in the closed feedback loop; a photoelectric current detection unit detecting a photoelectric current generated in each of the first photodiode and the second photodiode; and wherein the level adjustment unit adjusts the signal level on the basis of an output of the photoelectric current detection unit.

15 Claims, 15 Drawing Sheets

(56) References Cited

U.S. PATENT DOCUMENTS

| | | | | |
|---|---|---|---|---|
| 8,907,729 | B2* | 12/2014 | Temporiti Milani | H03F 3/087 250/214 A |
| 8,957,365 | B2* | 2/2015 | Tsunoda | H03F 3/08 250/214 A |
| 2001/0004388 | A1* | 6/2001 | Hatakeyama | H04B 10/6933 375/285 |
| 2003/0099020 | A1* | 5/2003 | Tanaka | H04B 10/6931 398/147 |
| 2003/0161640 | A1* | 8/2003 | Kimura | H03F 3/087 398/202 |
| 2004/0114939 | A1* | 6/2004 | Taylor | H04B 10/61 398/152 |
| 2006/0263100 | A1* | 11/2006 | Uesaka | H04B 10/66 398/202 |
| 2007/0115051 | A1* | 5/2007 | Sutardja | H03F 1/08 330/100 |
| 2008/0075473 | A1* | 3/2008 | Iguchi | H04B 10/6933 398/202 |
| 2009/0226187 | A1* | 9/2009 | Tanimura | H04B 10/60 398/202 |
| 2009/0252505 | A1* | 10/2009 | Terada | H04B 10/695 398/208 |
| 2010/0046948 | A1* | 2/2010 | Chraplyvy | H04B 10/677 398/79 |
| 2010/0067924 | A1* | 3/2010 | Noda | H03G 3/3084 398/202 |
| 2010/0284703 | A1* | 11/2010 | Suzuki | H01L 31/02019 398/212 |
| 2013/0027136 | A1* | 1/2013 | Ossieur | H03G 1/0023 330/279 |
| 2013/0028596 | A1* | 1/2013 | Suzuki | H04B 10/6931 398/25 |
| 2013/0343769 | A1* | 12/2013 | Noda | H04B 10/693 398/202 |
| 2014/0010556 | A1* | 1/2014 | Yoshima | H04B 10/272 398/212 |

\* cited by examiner

OPTICAL RECEIVER, OPTICAL RECEPTION DEVICE, AND CORRECTION METHOD FOR OPTICAL RECEIVED INTENSITY

CROSS REFERENCE TO RELATED APPLICATIONS

This application is a National Stage of International Application No. PCT/JP2011/059881 filed on Apr. 15, 2011, which claims priority from Japanese Patent Application No. 2010-097624, filed on Apr. 21, 2010, the contents of all of which are incorporated herein by reference in their entirety.

TECHNICAL FIELD

The present invention relates to optical receivers, optical reception devices, and correction methods for optical received intensity, and in particular, to an optical receiver, an optical reception device, and a correction method for optical received intensity which are available for DPSK (Differential Phase Shift Keying) system or DQPSK (Differential Quadrature Phase Shift Keying) system using the RZ (Return-to-Zero) code as a modulation code.

Moreover, the present invention relates to coherent optical receivers, and in particular, to a coherent optical receiver which is available for QPSK (Quadrature Phase Shift Keying) system as a modulation code.

BACKGROUND ART

The long-haul optical transmission system realizes economical and large-volume information transmission by applying the WDM (Wavelength Division Multiplexing) transmission technology which multiplexes a plurality of optical signals with various wavelengths and transmits them through one optical fiber. In order to reduce a cost of the WDM transmission device, a transmission speed per one wavelength is upgraded to high speed. The transmission speed of 10 gigabits per second (Gbit/s) for each wavelength is put into practical use currently, and furthermore a transmission technology for 40 Gbit/s and 100 Gbit/s has been studied.

When the transmission rate is speeded up to 40 Gbit/s and 100 Gbit/s from 10 Gbit/s, it becomes a main problem to improve the optical noise tolerance, that is, SN ratio (Signal to Noise ratio). In other words, in the case of long-haul transmission, the transmission length is generally limited due to the optical noise arising in an optical amplifier which is used on a transmission line and in an optical transmitter and receiver. Therefore, if the same modulation and demodulation system as that for 10 Gbit/s transmission rate is used for 40 Gbit/s transmission rate, the noise tolerance is reduced to a quarter. For this reason, in the case of the 40 Gbit/s transmission rate, it is necessary to adopt a modulation and demodulation system with the strong optical noise tolerance. The configuration is currently a typical system where RZ-DPSK system or RZ-DQPSK system is applied as the modulation/demodulation system and a balanced receiver using a delayed interferometer is applied in the receiving side.

An example of the above-mentioned optical reception device is described in patent literature 1. FIG. 12 shows the configuration of the related optical reception device 600 described in the patent literature 1. The optical reception device 600, which demodulates the RZ-DPSK signal, includes a related optical receiver 610 and a related 1-bit delayed interferometer 650. The 1-bit delayed interferometer 650 is provided with a 1-bit delay element in one optical waveguide of a set of optical waveguides, and outputs a set of two optical signals 652 and 653 which correspond to a phase difference between adjacent bits of one optical input signal 651.

The optical receiver 610 includes two photodiodes (PD) 611 and 612 and a transimpedance amplifier 620. The photodiodes (PD) 611 and 612 convert two optical signals outputted from the 1-bit delayed interferometer 650 into intensity modulated signals. The transimpedance amplifier 620 is provided with a differential amplifier with a differential negative feedback 622 and is connected to the photodiodes (PD) 611 and 612. The transimpedance amplifier 620 obtains the intensity modulated signals from the photodiodes (PD) 611 and 612 and demodulates the RZ-DPSK signal through outputting the difference between them.

In the related optical reception device available for the RZ-DPSK modulation, it is necessary that the phase difference by 1 bit between two signals is accurately kept and that the intensities of the signals are equal until the demodulation is carried out. However, the received intensity of two optical signals may not be kept equal in some cases due to the difference in the intensity or optical path between two optical signals on the path through which the optical inputting signal passes through the 1-bit delayed interferometer and lenses and then is inputted into the photodiode. The difference in the received intensity of these signals degrades CMRR (Common Mode Rejection Ratio) and causes waveform distortion and an increase of jitter after the demodulation. Moreover, it is difficult to control the optical received intensity mentioned above with a high degree of accuracy.

A technology for solving those problems is described in the patent literature 1. As shown in FIG. 13, another related optical reception device 700 described in the patent literature 1 is provided with a related optical receiver 710 and the 1-bit delayed interferometer 650. The optical receiver 710 includes two photodiodes (PD) 711 and 712, a transimpedance amplifier 720 with a differential negative feedback, and a level adjustment unit 730. The transimpedance amplifier 720 is provided with a differential amplifier 721 with a differential negative feedback 722, and is connected to the photodiodes (PD) 711 and 712. The level adjustment unit 730 is connected to the transimpedance amplifier 720 and has a function of adjusting the levels of positive and complementary signals in two closed feedback loops. By adjusting the levels of positive and complementary signals in two closed feedback loops, the difference in the intensities between two signals before demodulation is corrected.

On the other hand, the coherent detection system is well known where the detection is performed by mixing a signal light with a reference light and detecting an interfering signal (beat signal) which is generated by the mixture. FIG. 14 shows an example of the configuration of a related coherent optical reception device which is applied to the coherent detection system. The related coherent optical reception device 5000 receives an optical reception signal 5001 and a local oscillation light 5002 whose wavelength is almost equal to the optical reception signal 5001 from a local oscillation light source, and makes the local oscillation light 5002 and the optical reception signal 5001 interfere each other, and converts the interference signal into an electric signal (coherent detection). Since the coherent detection system has strong dependency on polarization, one optical receiver receives only an optical signal whose polarization state is identical to that of the local oscillation light. Then, the related coherent optical reception device 5000 is provided with a polarization demultiplexing unit 5010 at the input part of the optical reception signal 5001. The polarization demultiplexing unit 5010 demultiplexes the optical reception signal 5001 into two orthogonal polarization components. As a result, although it is necessary to use two optical receivers in order to receive one optical signal, this disadvantage can be compensated by making an amount of transmission information two times larger using polarization multiplexing scheme.

Each polarization light of the optical reception signal 5001 and the local oscillation light 5002 are inputted into an optical 90 degrees hybrid circuit 5100. The optical 90 degrees hybrid circuit 5100 outputs four kinds of output light in total, that is, a pair of output light which are obtained by making each polarization light and the local oscillation light interfere in normal phase and reversed phase, and another pair of output light which are obtained by making each polarization light and the local oscillation light interfere in quadrature phase (90 degrees) and inverted quadrature phase (−90 degrees). These output optical signals are converted into current signals by two photodiodes 5200 for a pair of output light, and then are inputted into a differential trans impedance amplifier 5300. Since their direct current components are balanced (canceled) consequently, it is possible to extract efficiently only the beat components between the optical reception signal 5001 and the local oscillation light 5002. The electrical signals outputted from the differential transimpedance amplifier 5300 correspond to an in-phase component (I component) and a quadrature component (Q component) of the interference between the optical reception signal and the local oscillation light, respectively.

The output signals for every polarization, that is, four kinds of the electrical signals in total which are composed of the I component and the Q component of X polarization and the I component and the Q component of Y polarization, are converted very fast from analog signals to digital signals by an analog-to-digital conversion unit (ADC) 5400, respectively. The electrical signal is converted into the digital information signal and then is inputted into a digital signal processing unit (DSP) 5500. It becomes possible to carry out various equalization and decision processes on the above-mentioned digital signal by applying the digital signal processing technology which is widely used in the field of the wireless communication. After carrying out the digital signal processing and the error correction processing, the super high speed (for example, 100 Gbit/s) information signal is outputted. Patent Literature 1: WO 2009/069814 (FIG. 1 and FIG. 11)

DISCLOSURE OF INVENTION

Problem to be Solved by the Invention

In the above-mentioned related optical reception device 700, the intensity difference between two signals before demodulation is corrected by adjusting the levels of positive and complementary signals in two closed feedback loops. At this time, in order to adjust the levels of positive and complementary signals in the feedback loops, it is necessary to observe a waveform of the demodulated signal. Therefore, there is a problem that it is impossible to correct the level adjustment automatically. As mentioned above, in the related optical receiver available for the RZ-DPSK modulation system, there is a problem that the difference in the received intensity due to the difference in the intensity or optical path of the optical signal cannot be corrected automatically.

On the other hand, with respect to the related coherent optical reception device 5000, the common mode rejection ratio (CMRR) for the optical input into the photodiode 5200 is one of the most important factors which determine the performance required for the coherent optical receiver. The CMRR is expressed in the following formula, where photoelectric currents generated by two photodiodes are represented by $I_1$ and $I_2$, respectively.

$$CMRR = 20\log\frac{|I_1 - I_2|}{I_1 + I_2}$$

Accordingly, the CMRR is degraded owing to the difference in the received intensity generated by the difference in the intensity or optical path of the optical signal. If the CMRR is degraded, surplus components of a pulse repetition frequency of the local oscillation light and its higher harmonics make the transimpedance amplifier saturated, and make its linearity decrease. As a result, it is difficult to equalize the waveform distortion accurately in the digital signal processing at the subsequent stage. However, the related coherent optical receiver has a problem that the difference in the received intensity due to the difference in the intensity or optical path of the optical signal cannot be corrected automatically.

An object of the present invention is to provide an optical receiver, an optical reception device, and a correction method for optical received intensity which are able to solve the problem that in the optical receiver available for the RZ-DPSK modulation system, the difference in the received intensity due to the difference in the intensity or optical path of the optical signal cannot be corrected automatically.

Moreover, an object of the present invention is to provide a coherent optical receiver which is able to solve the problem that in the related coherent optical receiver, the difference in the received intensity due to the difference in the intensity or optical path of the optical signal cannot be corrected automatically.

Means for Solving a Problem

An optical receiver according to an exemplary aspect of the invention includes a first photodiode receiving a normal phase optical signal from a first output of a 1-bit delayed interferometer and outputting a positive signal; a second photodiode receiving a reversed phase optical signal from a second output of the 1-bit delayed interferometer and outputting a complementary signal; a differential transimpedance amplifier inputting the positive signal and the complementary signal and including a closed feedback loop for each input of the positive signal and the complementary signal; a level adjustment unit adjusting a signal level in the closed feedback loop; a photoelectric current detection unit detecting a photoelectric current generated in each of the first photodiode and the second photodiode; and wherein the level adjustment unit adjusts the signal level on the basis of an output of the photoelectric current detection unit.

A correction method for optical received intensity according to an exemplary aspect of the invention includes the steps of receiving a normal phase optical signal from a first output of a 1-bit delayed interferometer and outputting a positive signal; receiving a reversed phase optical signal from a second output of the 1-bit delayed interferometer and outputting a complementary signal; inputting the positive signal and the complementary signal, and outputting a positive signal voltage and a complementary signal voltage, and feeding back the positive signal voltage and the complementary signal voltage to an input side; detecting a photoelectric current generated by each of the normal phase optical signal and the reversed phase optical signal; and adjusting a signal level in feedback on the basis of the photoelectric current.

A coherent optical receiver according to an exemplary aspect of the invention includes a first photodiode receiving a first interference optical signal obtained by making an optical reception signal interfere with a first local oscillation light whose wave length is almost the same as that of the optical reception signal, and outputting a positive signal; a second photodiode receiving a second interference optical signal obtained by making the optical reception signal interfere with a second local oscillation light whose phase is reverse to that of the first local oscillation light, and outputting a complementary signal; a differential transimpedance amplifier inputting the positive signal and the complementary signal and including a closed feedback loop for each input of the positive signal and the complementary signal; a level adjustment unit adjusting a signal level in the closed feedback loop; a photoelectric current detection unit detecting a photoelectric current generated in each of the first photodiode and the second photodiode, and wherein the level adjustment unit adjusts the signal level on the basis of an output of the photoelectric current detection unit.

A correction method for coherent optical received intensity according to an exemplary aspect of the invention includes the steps of receiving a first interference optical signal obtained by making an optical reception signal interfere with a first local oscillation light whose wavelength is almost the same as that of the optical reception signal, and outputting a positive signal converted into an electric signal; receiving a second interference optical signal obtained by making the optical reception signal interfere with a second local oscillation light whose phase is reverse to that of the first local oscillation light, and outputting a complementary signal converted into an electric signal; inputting the positive signal and the complementary signal, and outputting a positive signal voltage and a complementary signal voltage, and feeding back the positive signal voltage and the complementary signal voltage to an input side; detecting a photoelectric current generated by each of the first interference optical signal and the second interference optical signal; and adjusting a signal level in feedback on the basis of the photoelectric current.

Effect of the Invention

According to the optical receiver of the present invention, in the optical receiver available for the RZ-DPSK modulation system, it becomes possible to correct automatically the difference in the received intensity due to the difference in the intensity or optical path of the optical signal.

Moreover, according to the coherent optical receiver of the present invention, it becomes possible to correct automatically the difference in the received intensity due to the difference in the intensity or optical path of the optical signal.

DESCRIPTION OF EMBODIMENTS

The exemplary embodiments of the present invention will be described with reference to drawings below.

The First Exemplary Embodiment

Figure 1:
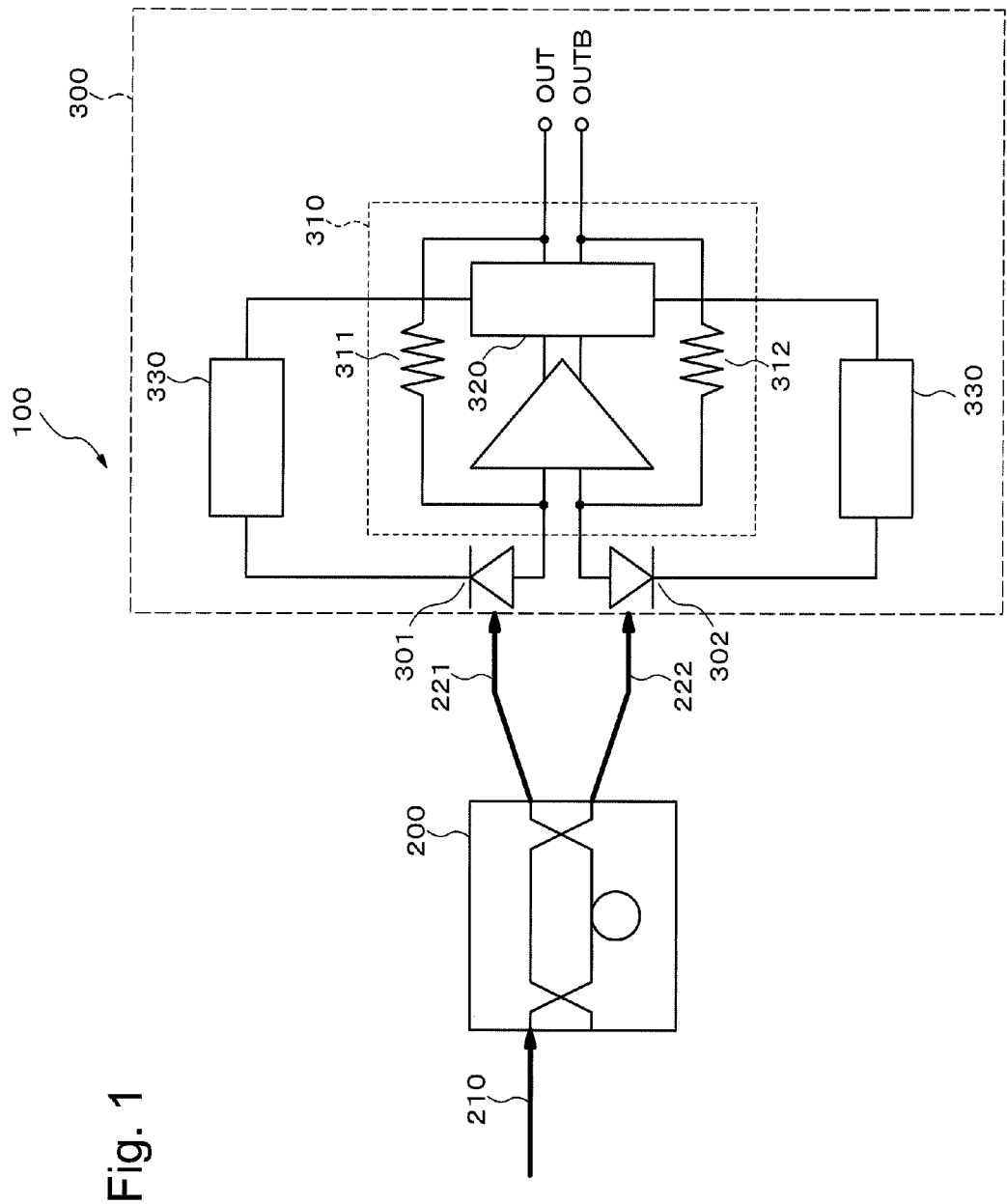
FIG. 1 is a block diagram showing the configuration of an optical reception device according to the first exemplary embodiment according to the present invention.

FIG. 1 is a block diagram showing the configuration of an optical reception device 100 according to the first exemplary embodiment of the present invention. The optical reception device 100 receives an optical modulated signal which is obtained by carrying out the differential phase shift keying (for example, DPSK system or DQPSK system) by using the return-to-zero (RZ) code (hereinafter, referred to as "RZ-DPSK signal"), and demodulates the received optical modulated signal. The optical reception device 100 includes a 1-bit delayed interferometer 200 and an optical receiver 300.

The 1-bit delayed interferometer 200 is provided with a 1-bit delay element in one of a pair of optical waveguides, and outputs a pair of two optical signals of a first optical signal 221 and a second optical signal 222 which correspond to a phase difference between adjacent bits of one optical input signal 210 modulated by the RZ-DPSK system. Here, it is assumed that the first optical signal 221 with a normal phase is outputted from a first output terminal of the 1-bit delayed interferometer 200 and the second optical signal 222 with a reversed phase is outputted from a second output terminal.

The optical receiver 300 includes a first photodiode 301, a second photodiode 302, a differential transimpedance amplifier 310, a level adjustment unit 320, and a photoelectric current detection unit 330.

The first photodiode 301 receives the first optical signal 221 with the normal phase from the first output terminal of the 1-bit delayed interferometer 200 and outputs a positive signal. The second photodiode 302 receives the second optical signal 222 with the reversed phase from the second output terminal of the 1-bit delayed interferometer 200 and outputs a complementary signal.

The differential transimpedance amplifier 310 inputs the positive signal from the first photodiode 301 and inputs the complementary signal from the second photodiode 302. Moreover, the differential transimpedance amplifier 310 is provided with a feedback resister 311 which composes a closed feedback loop for the positive signal input, and a feedback resister 312 which composes a closed feedback loop for the complementary signal input, respectively.

The photoelectric current detection unit 330 detects photoelectric currents which are generated by the first photodiode 301 and the second photodiode 302, respectively. And then, the level adjustment unit 320 adjusts signal levels in the closed feedback loops on the basis of the output of the optical current detection unit 330.

Next, the operation of the optical reception device 100 will be described. If the optical input signals 210 modulated by the RZ-DPSK system are inputted into the 1-bit delayed interferometer 200, the 1-bit delayed interferometer 200 outputs the first optical signal 221 and the second optical signal 222 whose phase difference corresponds to the phase difference between two adjacent bits. The first optical signal 221 and the second optical signal 222 are inputted into the first photodiode 301 and the second photodiode 302 respectively, and are converted into current intensity modulated signals by photoelectric conversion. The converted current signals are inputted into the differential transimpedance amplifier 310 which has the negative feedback loops, and then are converted from the current signals into voltage signals. The differential transimpedance amplifier 310 demodulates the input signal by deriving the difference between two input signals, and outputs two RZ-DPSK demodulated signals (OUT and OUTB) which have a positive and complementary relationship.

At this time, if there is a difference in the intensity between two optical input signals 221 and 222 composing a pair of two signals before demodulation, the difference appears as a difference between the photoelectric currents in the first photodiode 301 and the second photodiode 302.

Figure 5:
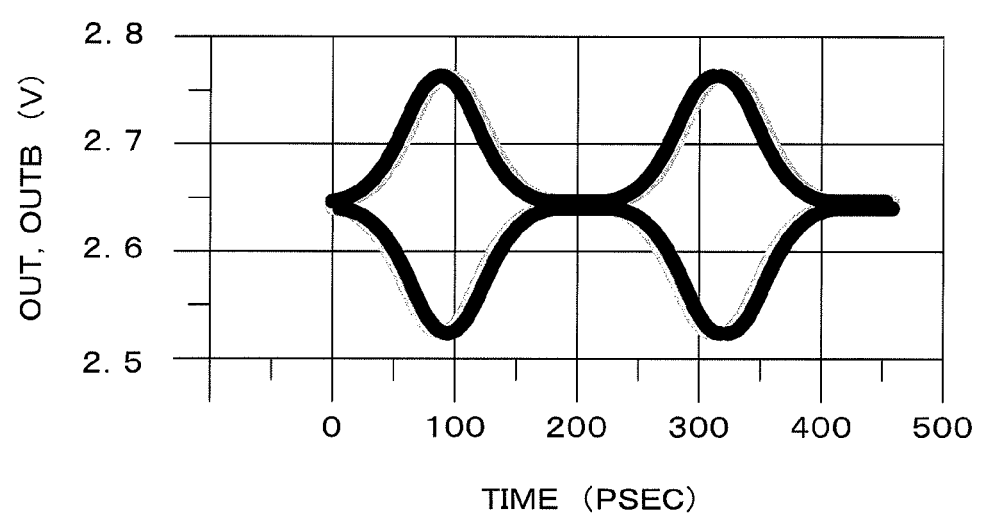
FIG. 5 is a waveform chart showing the signal waveforms after RZ-DPSK demodulation carried out by the optical reception device according to the exemplary embodiments of the present invention.

The optical reception device 100 of the present exemplary embodiment has the configuration of detecting the photoelectric currents generated by two photodiodes 301 and 302 by using the optical current detection unit 330, and feeding them back to the level adjustment unit 320 connected to the differential transimpedance amplifier 310. By using the configuration, the signal levels of positive and complementary signals in two closed feedback loops are adjusted and the difference in the intensity in a pair of two optical input signals 221 and 222 is corrected automatically. As a result, two RZ-DPSK demodulated signals are obtained where the difference in the intensity between two signals before the demodulation is corrected. FIG. 5 shows signal waveforms after RZ-DPSK demodulation carried out by the optical reception device 100 according to the present exemplary embodiment. As shown clearly in the figure, even if the difference in the intensity arises between the optical signals before the demodulation, it is possible to correct automatically the difference in the intensity between the optical signals, and to obtain the demodulated signal waveform with good quality.

As described above, according to the present exemplary embodiment, in the optical reception device available for the RZ-DPSK modulation system, it becomes possible to correct automatically the difference in the received intensity which arises from the difference in the intensity and the optical path of the optical signal.

The Second Exemplary Embodiment

Figure 2:
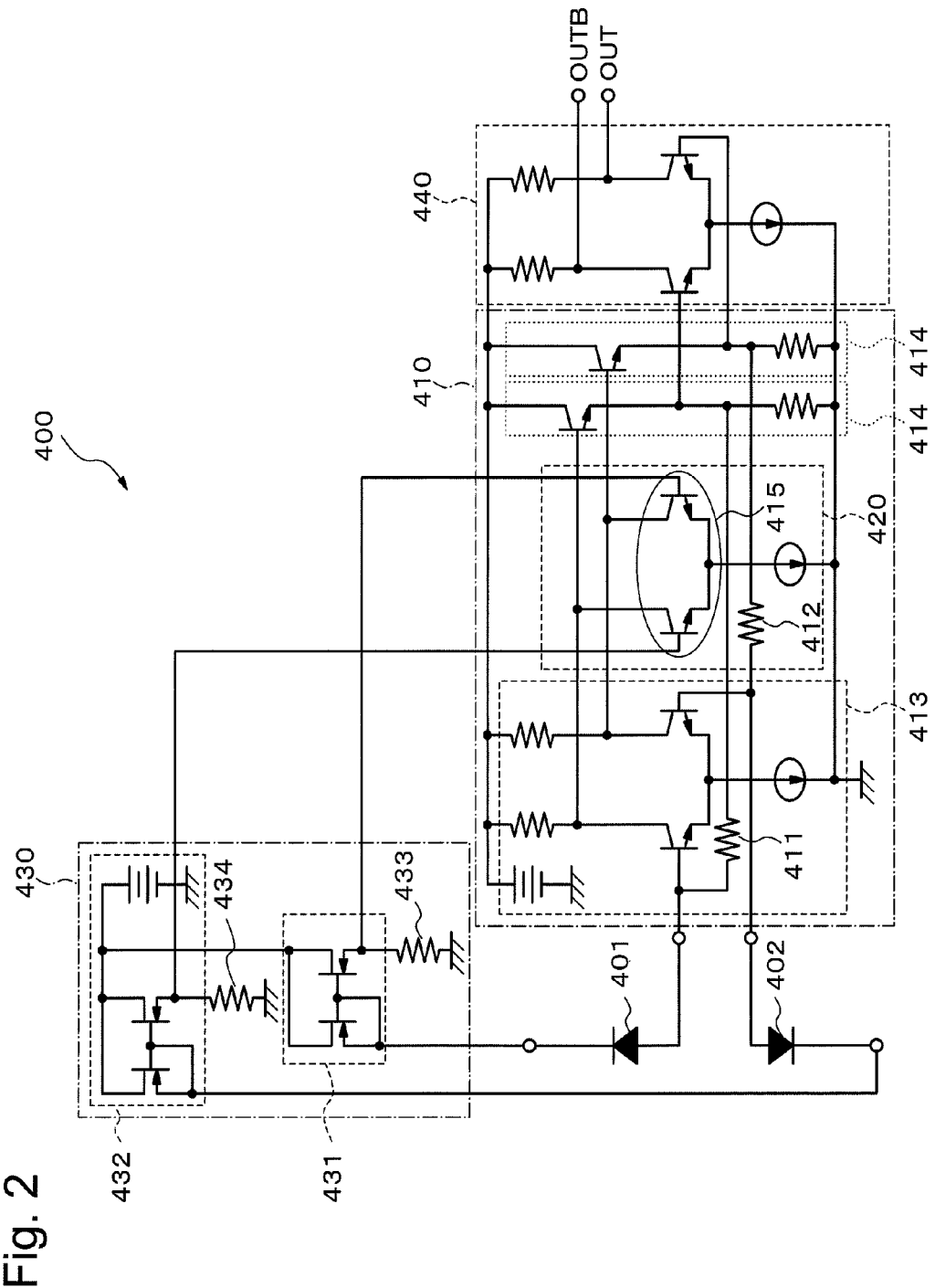
FIG. 2 is a circuit diagram showing the configuration of an optical receiver according to the second exemplary embodiment of the present invention.

Next, the second exemplary embodiment of the present invention will be described. FIG. 2 is a circuit diagram showing the configuration of an optical receiver 400 according to the second exemplary embodiment of the present invention. The optical receiver 400 includes a first photodiode 401, a second photodiode 402, a differential transimpedance amplifier 410, a level adjustment unit 420, and a photoelectric current detection unit 430. The configuration is the same as that of the optical receiver 300 according to the first exemplary embodiment. Here, the optical receiver 400 composes an optical reception device with the 1-bit delayed interferometer 200.

The first photodiode 401 and the second photodiode 402 receive optical signals whose phase difference corresponds to the phase difference between two adjacent bits. That is to say, the first photodiode 401 receives the first optical signal with the normal phase from the first output terminal of the 1-bit delayed interferometer 200, and outputs a positive signal. The second photodiode 402 receives a second optical signal with the reversed phase from the second output terminal of the 1-bit delayed interferometer 200, and outputs a complementary signal.

The photoelectric current detection unit 430 detects photoelectric currents which flow through the first photodiode 401 and the second photodiode 402, respectively.

The differential transimpedance amplifier 410 is connected to each output of the first photodiode 401 and the second photodiode 402, and the positive signal is inputted from the first photodiode 401 and the complementary signal is inputted from the second photodiode 402. Moreover, the differential transimpedance amplifier 410 composes closed feedback loops with feedback resisters 411 and 412. Here, as shown in FIG. 2, an output amplifier 440 can be connected at the subsequent stage of the differential transimpedance amplifier 410

In the present exemplary embodiment, the level adjustment unit 420 is configured as follows. That is to say, the level adjustment unit 420 adjusts the signal level in the closed feedback loop for the complementary signal input of the differential transimpedance amplifier 410 (feedback resister 412) on the basis of the photoelectric current generated by the normal phase optical signal in the first photodiode 401. And, the level adjustment unit 420 adjusts the signal level in the closed feedback loop for the positive signal input of the differential transimpedance amplifier 410 (feedback resister 411) on the basis of the photoelectric current generated by the reversed phase optical signal in the second photodiode 402.

Next, the configuration of the optical receiver 400 according to the present exemplary embodiment will be described more specifically. The differential transimpedance amplifier 410 is provided with a differential amplifier 413 which inputs the positive signal and the complementary signal, and an emitter-follower circuit 414 (or source-follower circuit) which is connected to the output of the differential amplifier 413. The closed feedback loops are configured with the feedback resisters 411 and 412 which are connected between the output of the emitter-follower circuit 414 and the input of the differential amplifier 413.

The level adjustment unit 420 is provided with a differential circuit 415 which is connected between the output of the differential amplifier 413 and the input of the emitter-follower circuit 414, and adjusts the signal levels of positive and complementary signals in the closed feedback loops respectively.

The photoelectric current detection unit 430 is provided with current mirror circuits 431 and 432 outputting proportional currents which are proportional to the photoelectric currents generated in the first photodiode 401 and the second photodiode 402 respectively. And it is configured so that the adjustment voltages can be inputted into the input of the differential circuit 415 in reverse between positive and complementary signals by resisters 433 and 434 as an adjustment voltage generation unit which generates an adjustment voltage according to the proportional current. That is to say, the adjustment voltage (generated in the resister 433), which is based on the positive signal outputted by the first photodiode 401, is inputted into the side which is connected to a complementary signal output of the differential amplifier 413 in the differential circuit 415 composing the level adjustment unit 420. On the other, the adjustment voltage (generated in the resister 434), which is based on the complementary signal outputted from the second photodiode 402, is inputted into the side which is connected to a positive signal output of the differential amplifier 413 in the differential circuit 415 composing the level adjustment unit 420. Here, electrical resistance values of the resisters 433 and 434 are set equal.

Figure 3:
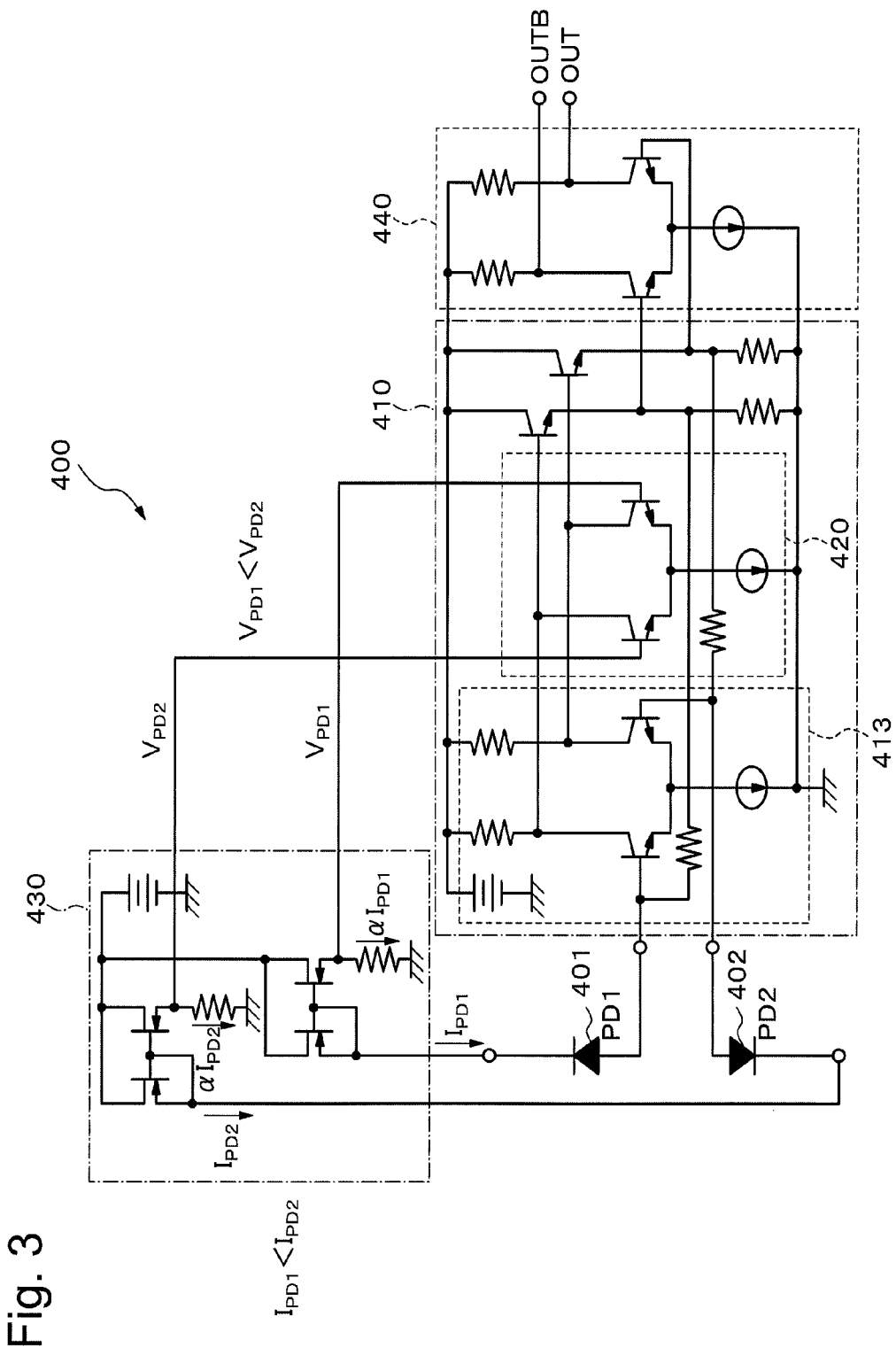
FIG. 3 is a circuit diagram to illustrate the operation of the optical receiver according to the second exemplary embodiment of the present invention.

Next, the operation of the optical receiver 400 according to the present exemplary embodiment will be described. FIG. 3 is a circuit diagram to illustrate the operation of the optical receiver 400 according to the present exemplary embodiment. The configuration of the optical receiver 400 is the same as that shown in FIG. 2.

If there is no difference in the intensity between the first optical signal received by the first photodiode 401 and the second optical signal received by the second photodiode 402, the same electric currents ($\alpha\ I_{PD1} = \alpha\ I_{PD2}$) flow through two current mirror circuits 431 and 432 in the photoelectric current detection unit 430. Therefore, the same voltages ($V_{PD1} = V_{PD2}$) are generated by the resisters 433 and 434, and the same voltages are inputted into the level adjustment unit 420. Accordingly, in this case, the positive and complementary signals are demodulated, amplified, and outputted without any change (OUT and OUTB).

If there is the difference in the intensity between the first optical signal and the second optical signal, the difference in the current arises between the photoelectric current flowing through the first photodiode 401 ($I_{PD1}$) and the photoelectric current flowing through the second photodiode 402 ($I_{PD2}$), for example, $I_{PD1} < I_{PD2}$. Therefore, electric currents ($\alpha\ I_{PD1} < \alpha\ I_{PD2}$) and voltages ($V_{PD1} < V_{PD2}$) corresponding to the difference in the current flowing through the photodiodes are generated in the photoelectric current detection unit 430.

According to the configuration of the optical receiver 400 of the present exemplary embodiment, the higher voltage ($V_{PD2}$) is applied to the side which is connected to the first photodiode 401 generating the smaller photoelectric current ($I_{PD1}$) in the differential circuit 415 composing the level adjustment unit 420. On the other hand, the lower voltage ($V_{PD1}$) is applied to the side which is connected to the second photodiode 402 generating the larger photoelectric current ($I_{PD1}$). As a result, the difference in the intensity between the first optical signal and the second optical signal is automatically corrected, and the demodulated waveform is outputted. FIG. 5 shows signal waveforms after RZ-DPSK demodulation. As mentioned above, even if the difference in the intensity arises between the optical signals before demodulation, according to the optical receiver 400 of the present exemplary embodiment, it is possible to correct automatically the difference in the received intensity and obtain the demodulated signal waveform with good quality.

While the case using the bipolar transistors is shown in FIG. 2 and FIG. 3, not limited to this, it is also possible to use a Field Effect Transistor (FET) such as the MOS (Metal Oxide Semiconductor) type and the like.

As described above, the optical receiver 400 of the present exemplary embodiment has the configuration where the photoelectric currents generated by the photodiodes are detected by the photoelectric current detection unit 430 and are fed back to the level adjustment unit 420. As a result, the signal levels of positive and complementary signals in two closed feedback loops of the differential transimpedance amplifier 410 are adjusted automatically. Therefore, it becomes possible to correct automatically the difference in the intensity between two optical signals before demodulation and to amplify the signals.

The Third Exemplary Embodiment

Figure 4:
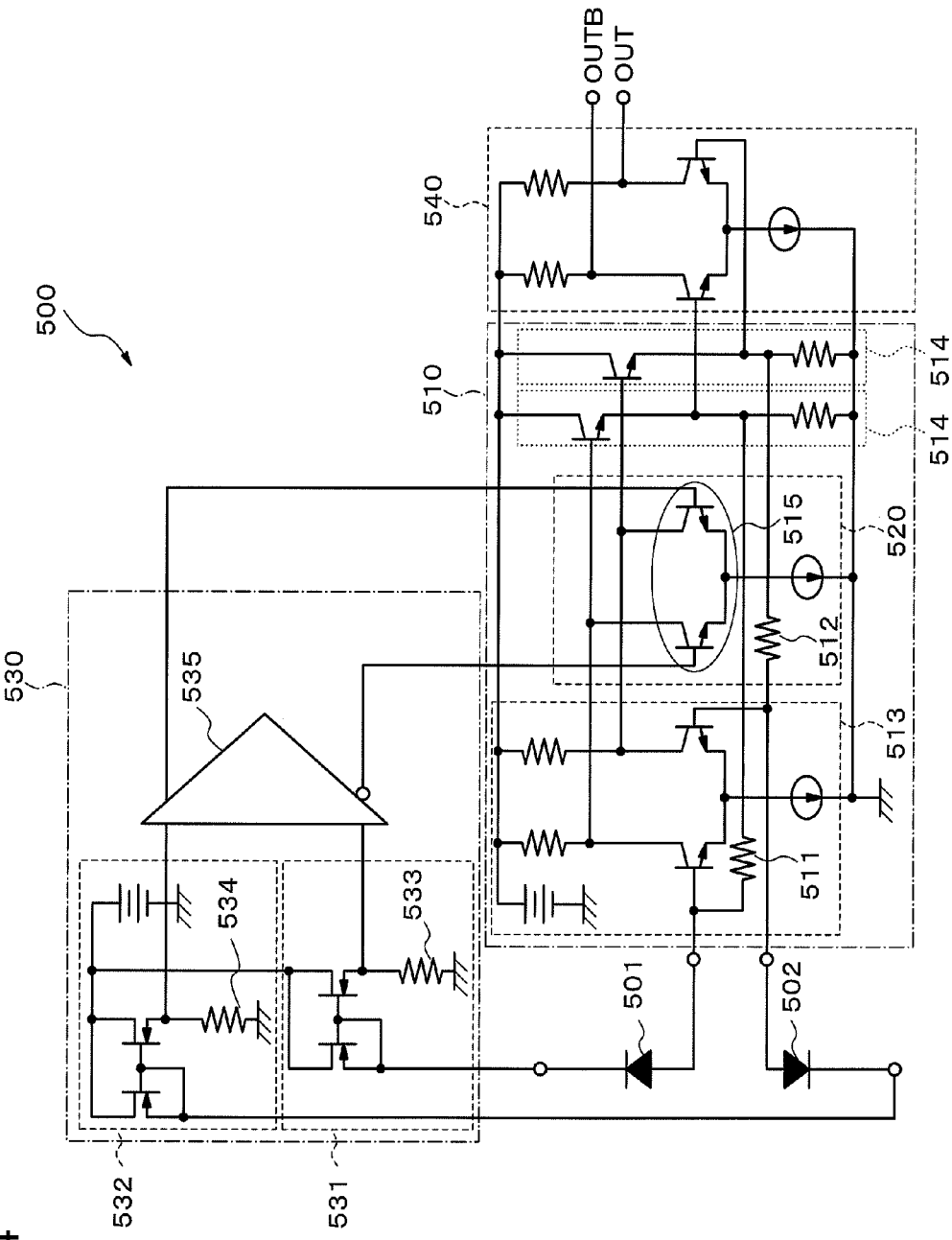
FIG. 4 is a circuit diagram showing the configuration of an optical receiver according to the third exemplary embodiment of the present invention.

Next, the third exemplary embodiment of the present invention will be described. FIG. 4 is a circuit diagram showing the configuration of an optical receiver 500 according to the third exemplary embodiment of the present invention. The optical receiver 500 includes a first photodiode 501, a second photodiode 502, a differential transimpedance amplifier 510, a level adjustment unit 520, and a photoelectric current detection unit 530. Here, the optical receiver 500 composes an optical reception device with the 1-bit delayed interferometer 200. In the optical receiver 500 according to the present exemplary embodiment, the configurations of the level adjustment unit 520 and the photoelectric current detection unit 530 are different from those of the optical receiver 400 according to the second exemplary embodiment.

The first photodiode 501 and the second photodiode 502 receive optical signals whose phase difference corresponds to the phase difference between two adjacent bits. That is to say, the first photodiode 501 receives a first optical signal with the normal phase from the first output terminal of the 1-bit delayed interferometer 200, and outputs a positive signal. The second photodiode 502 receives a second optical signal with the reversed phase from the second output terminal of the 1-bit delayed interferometer 200, and outputs a complementary signal.

The photoelectric current detection unit 530 detects photoelectric currents which flow through the first photodiode 501 and the second photodiode 502, respectively.

The differential transimpedance amplifier 510 is connected to each output of the first photodiode 501 and the second photodiode 502, and the positive signal is inputted from the first photodiode 501 and the complementary signal is inputted from the second photodiode 502. Moreover, the differential transimpedance amplifier 510 composes closed feedback loops with feedback resisters 511 and 512. Here, as shown in FIG. 4, an output amplifier 540 can be connected at the subsequent stage of the differential transimpedance amplifier 510.

In the present exemplary embodiment, the level adjustment unit 520 is configured as follows. That is to say, the level adjustment unit 520 adjusts the signal level in the feedback loop for the input of the positive signal of the differential transimpedance amplifier 510 (feedback register 511) on the basis of the reversed value of the voltage generated according to the photoelectric current which is generated in the first photodiode 501 by the normal phase optical signal. And, the level adjustment unit 520 adjusts the signal level in the feedback loop for the input of the complementary signal of the differential transimpedance amplifier 510 (feedback register 512) on the basis of the reversed value of the voltage generated according to the photoelectric current which is generated in the second photodiode 502 by the reversed phase optical signal.

Next, the configuration of the optical receiver 500 according to the present exemplary embodiment will be described more specifically. The differential transimpedance amplifier 510 is provided with a differential amplifier 513 which inputs the positive signal and the complementary signal, and an emitter-follower circuit 514 (or, source-follower circuit) which is connected to the output of the differential amplifier 413. The closed feedback loops are configured with the feedback resisters 511 and 512 which are connected between the output of the emitter-follower circuit 514 and the input of the differential amplifier 513.

The level adjustment unit 520 is provided with a differential circuit 515 which is connected between the output of the differential amplifier 513 and the input of the emitter-follower circuit 514, and adjusts the signal levels of positive and complementary signals in the closed feedback loops respectively.

The photoelectric current detection unit 530 is provided with current mirror circuits 531 and 532 outputting proportional currents which are proportional to the photoelectric currents generated in the first photodiode 501 and the second photodiode 502 respectively. Furthermore, the photoelectric current detection unit 530 includes resisters 533 and 534 as an adjustment voltage generation unit which generates an adjustment voltage according to the proportional current, and an inverter circuit 535 outputting a level adjustment voltage which is obtained by inverting the adjustment voltage and amplifying it. And the level adjustment voltage is inputted into the differential circuit 515 which composes the level adjustment unit 520. That is to say, the adjustment voltage (generated in the resister 533), which is based on the positive signal outputted by the first photodiode 501, is inverted by the inverter circuit 535, and is inputted into the side which is connected to a positive signal output of the differential amplifier 513 in the differential circuit 515 composing the level adjustment unit 520. On the other, the adjustment voltage (generated in the resister 534), which is based on the complementary signal outputted from the second photodiode 502, is inverted by the inverter circuit 535, and is inputted into the side which is connected to a complementary signal output of the differential amplifier 513 in the differential circuit 515 composing the level adjustment unit 520. Here, electrical resistance values of the resisters 533 and 534 are set equal.

Next, the operation of the optical receiver 500 according to the present exemplary embodiment will be described. If there is no difference in the intensity between the first optical signal received by the first photodiode 501 and the second optical signal received by the second photodiode 502, the same electric currents flow through two current mirror circuits 531 and 532 in the photoelectric current detection unit 530. Therefore, the level adjustment voltages of the outputs of the inverter circuit 535 become equal, and the equal voltage is inputted into the differential circuit 515 composing the level adjustment unit 520. Accordingly, in this case, the positive and the complementary signals are demodulated, amplified, and outputted without any change (OUT and OUTB).

If there is the difference in the intensity between the first optical signal and the second optical signal, the difference in the current arises between the photoelectric current flowing through the first photodiode 501 and the photoelectric current flowing through the second photodiode 502. At this time, the inverter circuit 535 outputs the level adjustment voltages which are obtained by inverting the adjustment voltages corresponding to the currents which flow through the photodiodes and amplifying them. And then, the level adjustment voltages are inputted into the differential circuit 515 composing the level adjustment unit 520.

As mentioned above, according to the configuration of the optical receiver 500 of the present exemplary embodiment, the inverter circuit 535 outputs the level adjustment voltages depending on an amount to correct the difference in the intensity between the first optical signal and the second optical signal. Therefore, the difference in the intensity between the first optical signal and the second optical signal is automatically corrected. FIG. 5 shows signal waveforms after RZ-DPSK demodulation. As described clearly in FIG. 5, even if the difference in the intensity arises between the optical signals before demodulation, according to the optical receiver 500 of the present exemplary embodiment, it is possible to correct automatically the difference in the received intensity and obtain the demodulated signal waveform with good quality.

While the case using the bipolar transistors is shown in FIG. 4, not limited to this, it is also possible to use field effect transistors such as the MOS type and the like.

As described above, the optical receiver 500 of the present exemplary embodiment has the configuration where the photoelectric currents generated by the photodiodes are detected by the photoelectric current detection unit 530 and are fed back to the level adjustment unit 520. As a result, the signal levels of positive and complementary signals in two closed feedback loops of the differential transimpedance amplifier 510 are adjusted automatically. Therefore, it becomes possible to correct automatically the difference in the intensity between two optical signals before demodulation and to amplify the signals.

The Fourth Exemplary Embodiment

Figure 6:
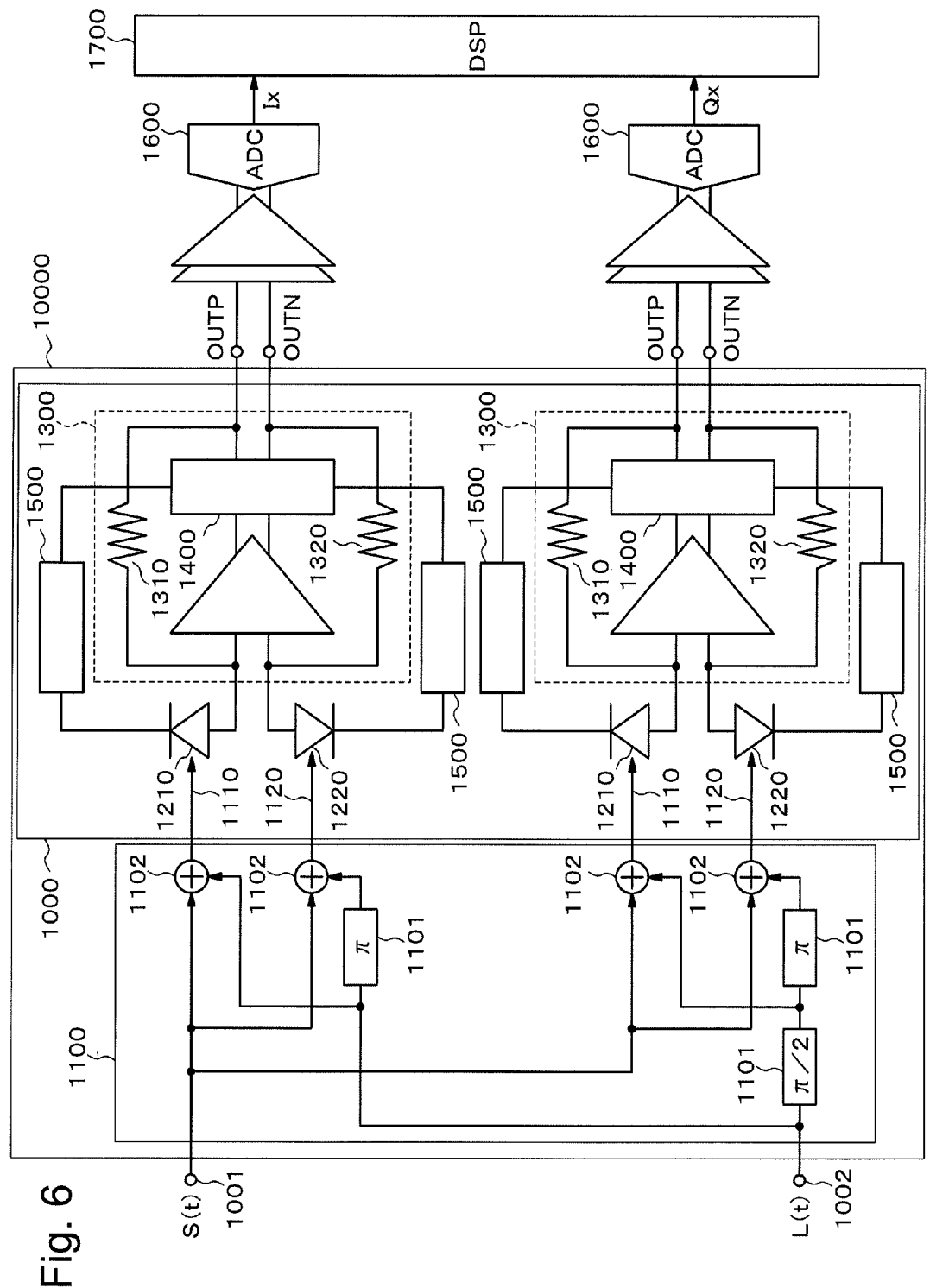
FIG. 6 is a block diagram showing the configuration of a coherent optical reception device according to the fourth exemplary embodiment of the present invention.

Next, the fourth exemplary embodiment of the present invention will be described. In the present exemplary embodiment, a case using the coherent detection system will be described. FIG. 6 is a block diagram showing the configuration of a coherent optical reception device according to the fourth exemplary embodiment of the present invention. FIG. 6 shows a part of the coherent optical reception device which is related to one polarization (polarization X). A coherent optical reception device 10000 includes a coherent optical receiver 1000 and an optical 90 degrees hybrid circuit 1100.

The optical 90 degrees hybrid circuit 1100 is provided with an optical phase shifter 1101 and an optical mixer 1102. The optical 90 degrees hybrid circuit 1100 inputs an optical reception signal 1001 and a first local oscillation light 1002, whose wave length is almost the same as that of the optical reception signal 1001, from a local oscillation light source. Here, the optical reception signal 1001 is the demultiplexed signal into X polarization or Y polarization by a polarization beam splitter (PBS).

The optical 90 degrees hybrid circuit 1100 outputs a first interference optical signal by making the optical reception signal 1001 interfere with the first local oscillation light 1002, and outputs a second interference optical signal by making the optical reception signal 1001 interfere with a second local oscillation light whose phase is reverse to that of the first local oscillation light 1002. Specifically, in the case of carrying out the coherent reception of the optical signal modulated by a quadrature phase shift keying (QPSK), as shown in FIG. 6, the optical reception signal 1001 is split into four branches by an optical coupler in the optical 90 degrees hybrid circuit

1100. Similarly, the first local oscillation light 1002 is split into four branches by an optical coupler, each phase is shifted by 0, $\pi/2$, $\pi$, or $3\pi/2$, and then each branch light is made interfere with the optical reception signal 1001, respectively.

The coherent optical receiver 1000 includes a first photodiode 1210, a second photodiode 1220, a differential transimpedance amplifier 1300, a level adjustment unit 1400, and a photoelectric current detection unit 1500. The output of the differential transimpedance amplifier 1300 is connected to an analog-to-digital conversion unit (ADC) 1600 and a digital signal processing unit (DSP) 1700 via an amplifier circuit.

The first photodiode 1210 receives a first interference optical signal 1110 from the optical 90 degrees hybrid circuit 1100, and outputs a positive signal. The second photodiode 1220 receives a second interference optical signal 1120, and outputs a complementary signal.

Into the differential transimpedance amplifier 1300, the positive signal is inputted from the first photodiode 1210, and the complementary signal is inputted from the second photodiode 1220. The differential transimpedance amplifier 1300 is provided with a feedback resister 1310 composing a closed feedback loop for the positive signal input and a feedback resister 1320 composing a closed feedback loop for the complementary signal input, respectively.

The photoelectric current detection unit 1500 detects photoelectric currents generated in the first photodiode 1210 and the second photodiode 1220 respectively. And then, the level adjustment unit 1400 adjusts a signal level in the closed feedback loop on the basis of the output of the photoelectric current detection unit 1500.

Next, the operation of the coherent optical reception device 10000 will be described. The optical reception signal 1001 and the first local oscillation light 1002 are inputted into the optical 90 degrees hybrid circuit 1100. The optical 90 degrees hybrid circuit 1100 makes the optical reception signal 1001 interfere with the first local oscillation light 1002 and outputs a first interference optical signal 1110. And, the optical 90 degrees hybrid circuit 1100 makes the optical reception signal 1001 interfere with the second local oscillation light whose phase is reverse to that of the first local oscillation light and outputs a second interference optical signal 1120. The first interference optical signal 1110 and the second interference optical signal 1120 are inputted into the first photodiode 1210 and the second photodiode 1220 respectively and are converted into current intensity modulated signals by carrying out the photoelectric conversion. The converted current signals are inputted into the differential transimpedance amplifier 1300 which has negative feedback loops, and are changed from current signals to voltage signals. The differential transimpedance amplifier 1300 demodulates the input signal by deriving the difference between two input signals, and outputs two demodulation signals which have a positive and complementary relationship (OUTP and OUTN).

At this time, if there is a difference in the intensity between the first interference optical signal 1110 and the second interference optical signal 1120, the difference appears as a difference between the photoelectric current in the first photodiode 1210 and that in the second photodiode 1220.

Here, the optical reception device 10000 of the present exemplary embodiment has the configuration of detecting the photoelectric currents generated by two photodiodes 1210 and 1220 by using the photoelectric current detection unit 1500, and feeding them back to the level adjustment unit 1400 connected to the differential transimpedance amplifier 1300. By using the configuration, the signal levels of positive and complementary signals in two closed feedback loops are adjusted and the difference in the intensity between the first interference optical signal 1110 and the second interference optical signal 1120 is corrected automatically. As a result, two demodulated signals are obtained where the difference in the intensity between two signals before the demodulation is corrected. The demodulated signal is amplified by an amplifier circuit, analog-to-digital converted by the analog-to-digital conversion unit (ADC) 1600 connected to the subsequent stage, on which the digital signal processing is performed such as the polarization demultiplexing, the offset compensation for light source frequency, the phase compensation, and the like in the digital signal processing unit (DSP) 1700.

Figure 9:
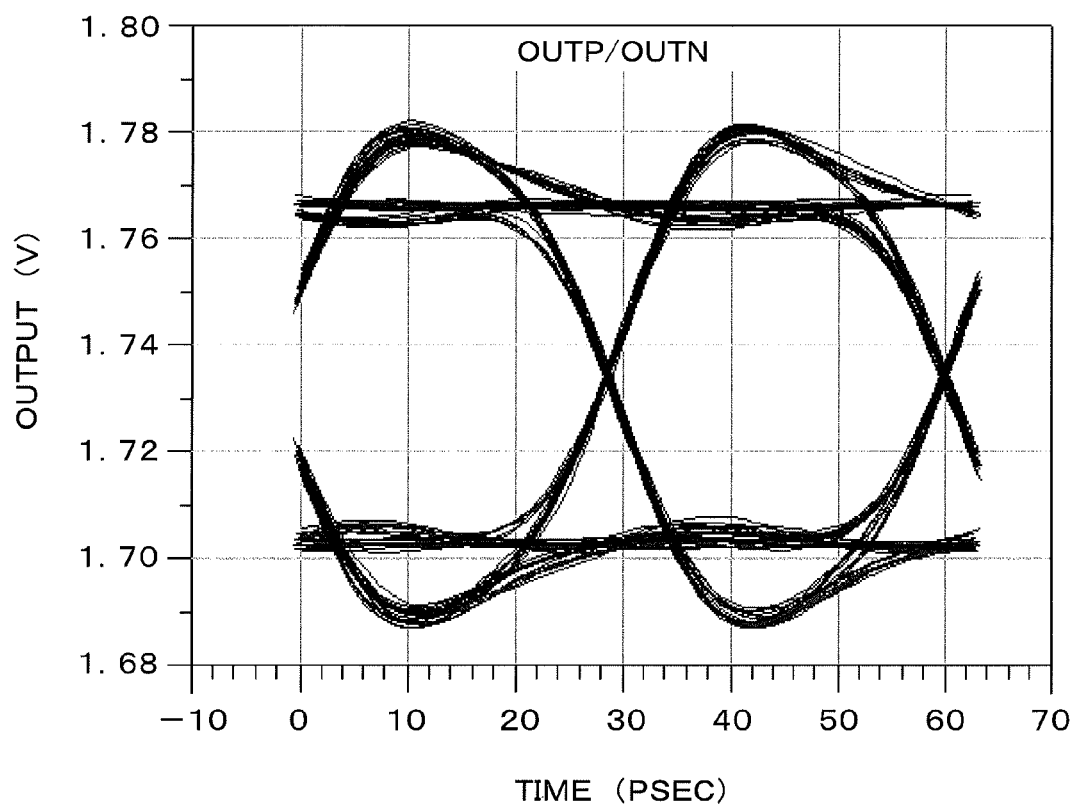
FIG. 9 is a waveform chart showing the signal waveforms after QPSK demodulation in the case of using the coherent optical receiver according to the exemplary embodiments of the present invention.
Figure 15:
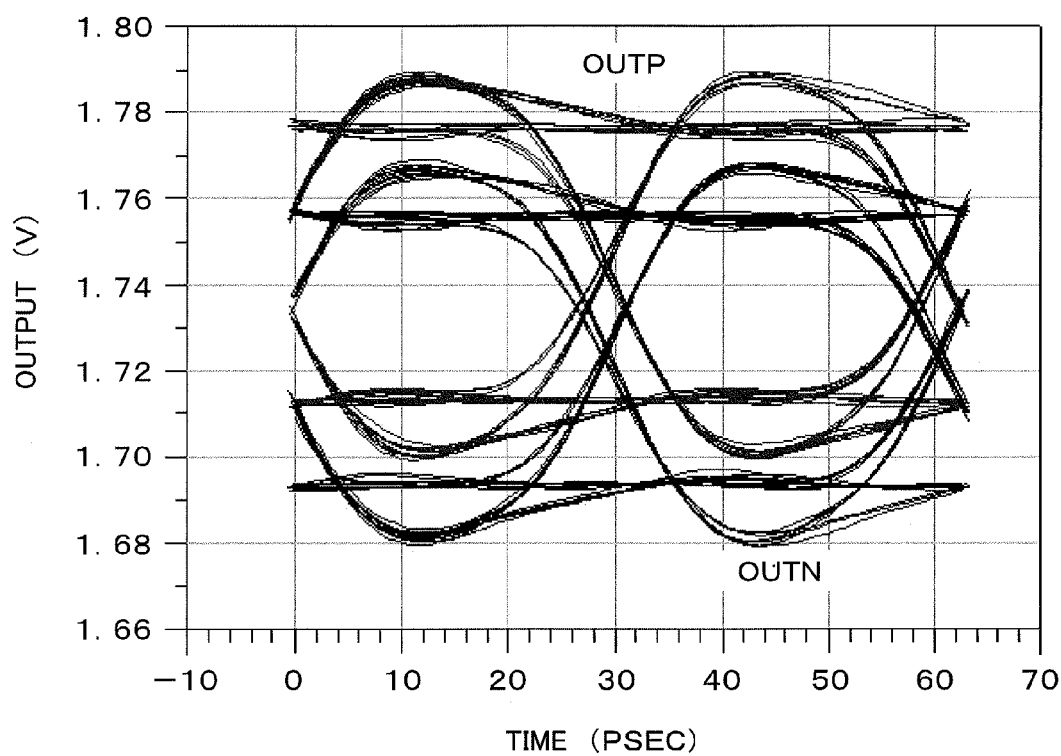
FIG. 15 is a waveform chart showing the signal waveforms after QPSK demodulation carried out by a related coherent optical reception device.

FIG. 9 shows signal waveforms after QPSK demodulation carried out by the coherent optical reception device 10000 according to the present exemplary embodiment. In this case, a bit rate is equal to 31.78911 Gb/s. As shown clearly in the figure, even if the difference in the intensity arises between the optical signals before the demodulation, it is possible to correct automatically the difference in the intensity between the optical signals, and to obtain the demodulated signal waveform with good quality. FIG. 15 shows signal waveforms after the demodulation carried out by a related coherent optical reception device, for comparison. In this case, it is found from the figure that another correction process is necessary for those demodulated signals.

As described above, according to the present exemplary embodiment, in the coherent optical reception device, it becomes possible to correct automatically the difference in the received intensity which arises from the difference in the intensity and the optical path of the optical signal. That is to say, it is possible to correct automatically the deterioration of CMRR which arises in the photodiode, and to obtain the QPSK demodulation signal with good quality.

The Fifth Exemplary Embodiment

Figure 7:
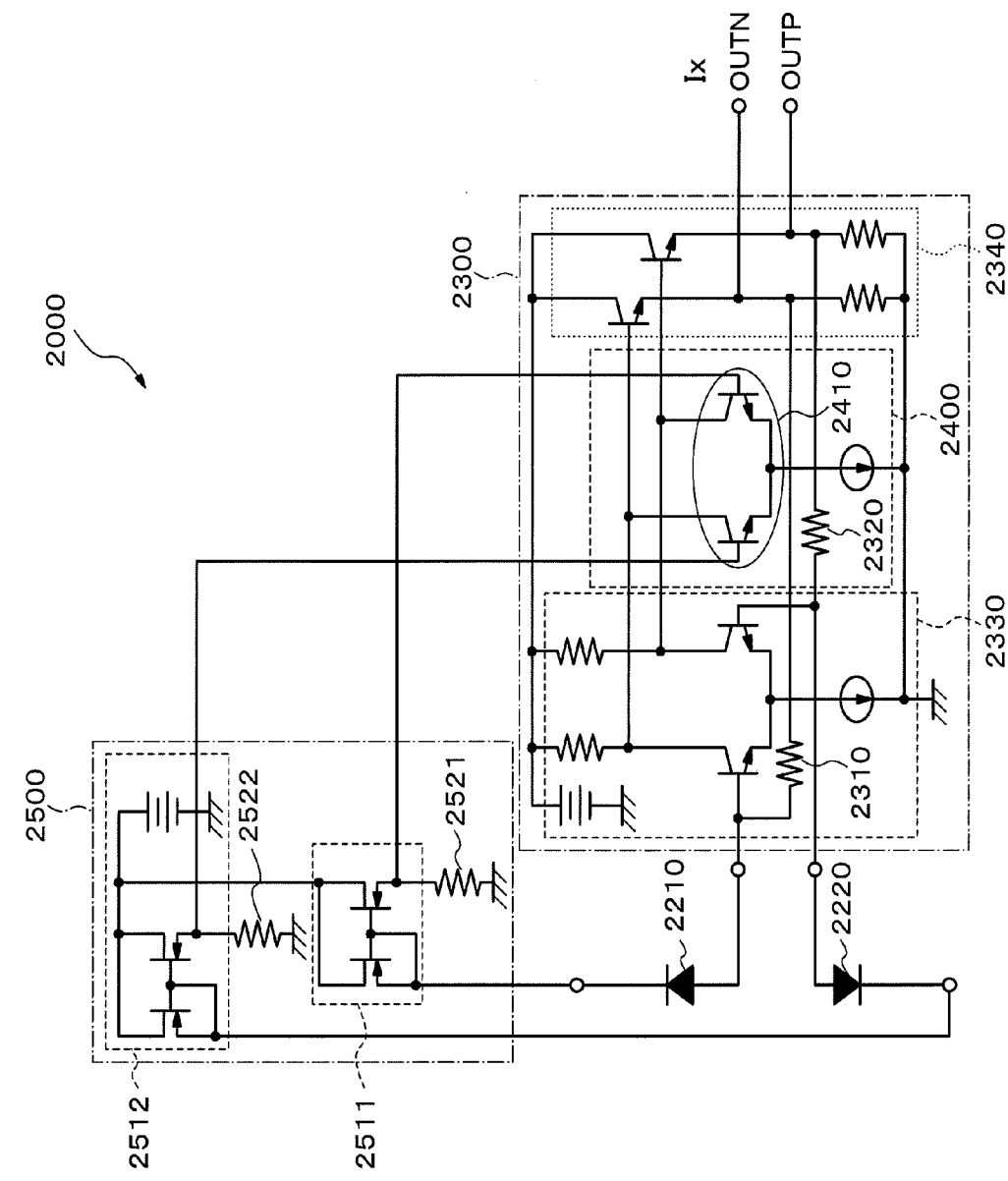
FIG. 7 is a circuit diagram showing the configuration of a coherent optical receiver according to the fifth exemplary embodiment of the present invention.

Next, the fifth exemplary embodiment of the present invention will be described. In the present exemplary embodiment, a case using the coherent detection system will be described. FIG. 7 is a circuit diagram showing the configuration of a coherent optical receiver 2000 according to the fifth exemplary embodiment of the present invention. FIG. 7 shows only a part which is related to an I channel (Ix) of one polarization (polarization X) in the coherent optical receiver. The coherent optical receiver 2000 includes a first photodiode 2210, a second photodiode 2220, a differential transimpedance amplifier 2300, a level adjustment unit 2400, and a photoelectric current detection unit 2500. Here, the coherent optical receiver 2000 composes a coherent optical reception device with the optical 90 degrees hybrid circuit 1100.

Each of the first photodiode 2210 and the second photodiode 2220 receives an interference optical signal which is obtained by making an optical reception signal interfere with a local oscillation light. That is to say, the first photodiode 2210 receives a first interference optical signal from the optical 90 degrees hybrid circuit 1100, and outputs a positive signal. The second photodiode 2220 receives a second interference optical signal from the optical 90 degrees hybrid circuit 1100, and outputs a complementary signal.

The photoelectric current detection unit 2500 detects photoelectric currents which flow through the first photodiode 2210 and the second photodiode 2220, respectively.

The differential transimpedance amplifier 2300 is connected to each output of the first photodiode 2210 and the second photodiode 2220, and the positive signal is inputted from the first photodiode 2210 and the complementary signal is inputted from the second photodiode 2220. Moreover, the differential transimpedance amplifier 2300 composes closed feedback loops with feedback resisters 2310 and 2320.

In the present exemplary embodiment, the level adjustment unit 2400 is configured as follows. That is to say, the level adjustment unit 2400 adjusts the signal level in the closed feedback loop for the complementary signal input of the differential transimpedance amplifier 2300 (feedback resister 2320) on the basis of the photoelectric current generated by the first interference optical signal in the first photodiode 2210. And, the level adjustment unit 2400 adjusts the signal level in the closed feedback loop for the positive signal input of the differential transimpedance amplifier 2300 (feedback resister 2310) on the basis of the photoelectric current generated by the second interference optical signal in the second photodiode 2220.

Next, the configuration of the coherent optical receiver 2000 according to the present exemplary embodiment will be described more specifically. The differential transimpedance amplifier 2300 is provided with a differential amplifier 2330 which inputs the positive signal and the complementary signal, and an emitter-follower circuit 2340 (or source-follower circuit) which is connected to the output of the differential amplifier 2330. The closed feedback loops are configured with the feedback resisters 2310 and 2320 which are connected between the output of the emitter-follower circuit 2340 and the input of the differential amplifier 2330.

The level adjustment unit 2400 is provided with a differential circuit 2410 which is connected between the output of the differential amplifier 2330 and the input of the emitter-follower circuit 2340, and adjusts the signal levels of positive and complementary signals in the closed feedback loops respectively.

The photoelectric current detection unit 2500 is provided with current mirror circuits 2511 and 2512 outputting proportional currents which are proportional to the photoelectric currents generated in the first photodiode 2210 and the second photodiode 2220 respectively. Although the case using current mirror circuits is described as an example in the present exemplary embodiment, not limited to the case, it is also possible to use a circuit other than the current mirror circuit as long as the circuit outputs the proportional current which is proportional to the inputted photoelectric current.

The coherent optical receiver 2000 of the present exemplary embodiment is configured so that the adjustment voltages can be inputted into the input of the differential circuit 2410 in reverse between positive and complementary signals by resisters 2521 and 2522 as an adjustment voltage generation unit which generates an adjustment voltage according to the proportional current. That is to say, the adjustment voltage (generated in the resister 2521), which is based on the positive signal outputted by the first photodiode 2210, is inputted into the side which is connected to a complementary signal output of the differential amplifier 2330 in the differential circuit 2410 composing the level adjustment unit 2400. On the other, the adjustment voltage (generated in the resister 2522), which is based on the complementary signal outputted from the second photodiode 2220, is inputted into the side which is connected to a positive signal output of the differential amplifier 2330 in the differential circuit 2410 composing the level adjustment unit 2400.

Figure 8:
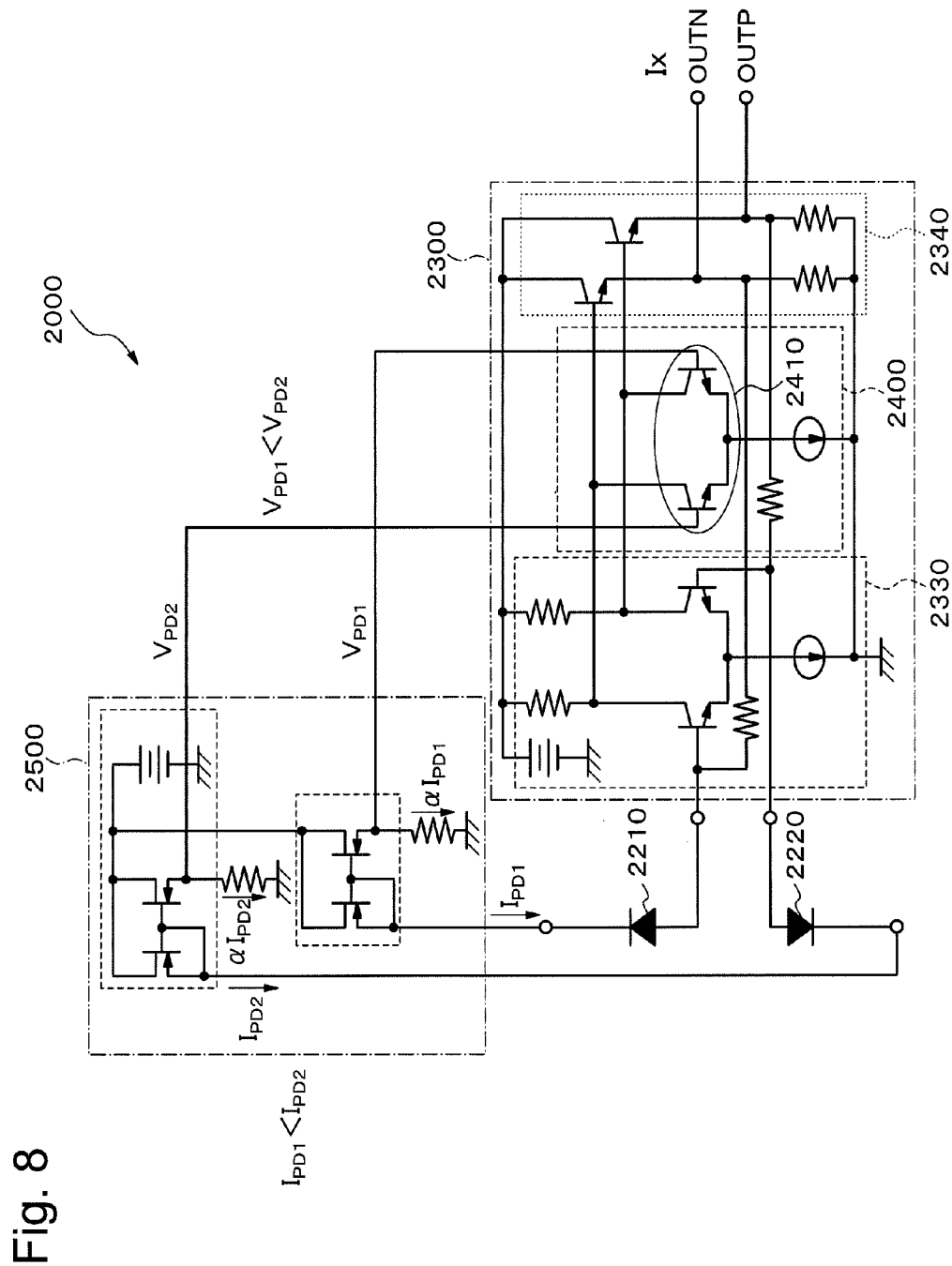
FIG. 8 is a circuit diagram to illustrate the operation of the coherent optical receiver according to the fifth exemplary embodiment of the present invention.

Next, the operation of the coherent optical receiver 2000 according to the present exemplary embodiment will be described. FIG. 8 is a circuit diagram to illustrate the operation of the coherent optical receiver 2000 according to the present exemplary embodiment. The configuration of the coherent optical receiver 2000 is the same as that shown in FIG. 7.

If there is no difference in the intensity between the first interference optical signal received by the first photodiode 2210 and the second interference optical signal received by the second photodiode 2220, the same electric currents ($\alpha$ $I_{PD1}=\alpha_{IPD2}$) flow through two current mirror circuits 2511 and 2512 in the photoelectric current detection unit 2500. Therefore, the same voltages ($V_{PD1}=V_{PD2}$) are generated by the resisters 2521 and 2522, and the same voltages are applied to the level adjustment unit 2400. Accordingly, in this case, the positive and complementary signals are demodulated, amplified, and outputted without any change (OUTP and OUTN).

If there is the difference in the intensity between the first interference optical signal and the second interference optical signal, the difference in the current arises between the photoelectric current flowing through the first photodiode 2210 ($I_{PD1}$) and the photoelectric current flowing through the second photodiode 2220 ($I_{PD2}$), for example, $I_{PD1}<I_{PD2}$. Therefore, electric currents ($\alpha$ $I_{PD1}<\alpha_{IPD2}$) and voltages ($V_{PD1}<V_{PD2}$) corresponding to the difference in the current flowing through the photodiodes are generated in the photoelectric current detection unit 2500.

According to the configuration of the coherent optical receiver 2000 of the present exemplary embodiment, the higher voltage ($V_{PD2}$) is applied to the side which is connected to the first photodiode 2210 generating the smaller photoelectric current ($I_{PD1}$) in the differential circuit 2410 composing the level adjustment unit 2400. On the other hand, the lower voltage ($V_{PD1}$) is applied to the side which is connected to the second photodiode 2220 generating the larger photoelectric current ($I_{PD1}$). As a result, the difference in the intensity between the first interference optical signal and the second interference optical signal is automatically corrected, and the demodulation waveform is outputted. FIG. 9 shows signal waveforms after QPSK demodulation in the case that the difference in the intensity arises between the optical signals before demodulation. In this case, a bit rate is equal to 31.78911 Gb/s. As mentioned above, even if the difference in the intensity arises between the optical signals before demodulation, according to the optical receiver 2000 of the present exemplary embodiment, it is possible to correct automatically the difference in the received intensity and obtain the demodulated signal waveform with good quality.

While the case using the bipolar transistors is shown in FIG. 7 and FIG. 8, not limited to this, it is also possible to use a Field Effect Transistor (FET) such as the MOS (Metal Oxide Semiconductor) type and the like.

As described above, the coherent optical receiver 2000 of the present exemplary embodiment has the configuration where the photoelectric currents generated by the photodiodes are detected by the photoelectric current detection unit 2500 and are fed back to the level adjustment unit 2400. As a result, the signal levels of positive and complementary signals in two closed feedback loops of the differential transimpedance amplifier 2300 are adjusted automatically. Therefore, it becomes possible to correct automatically the difference in the intensity between two optical signals before demodulation and to amplify the signals.

The Sixth Exemplary Embodiment

Figure 10:
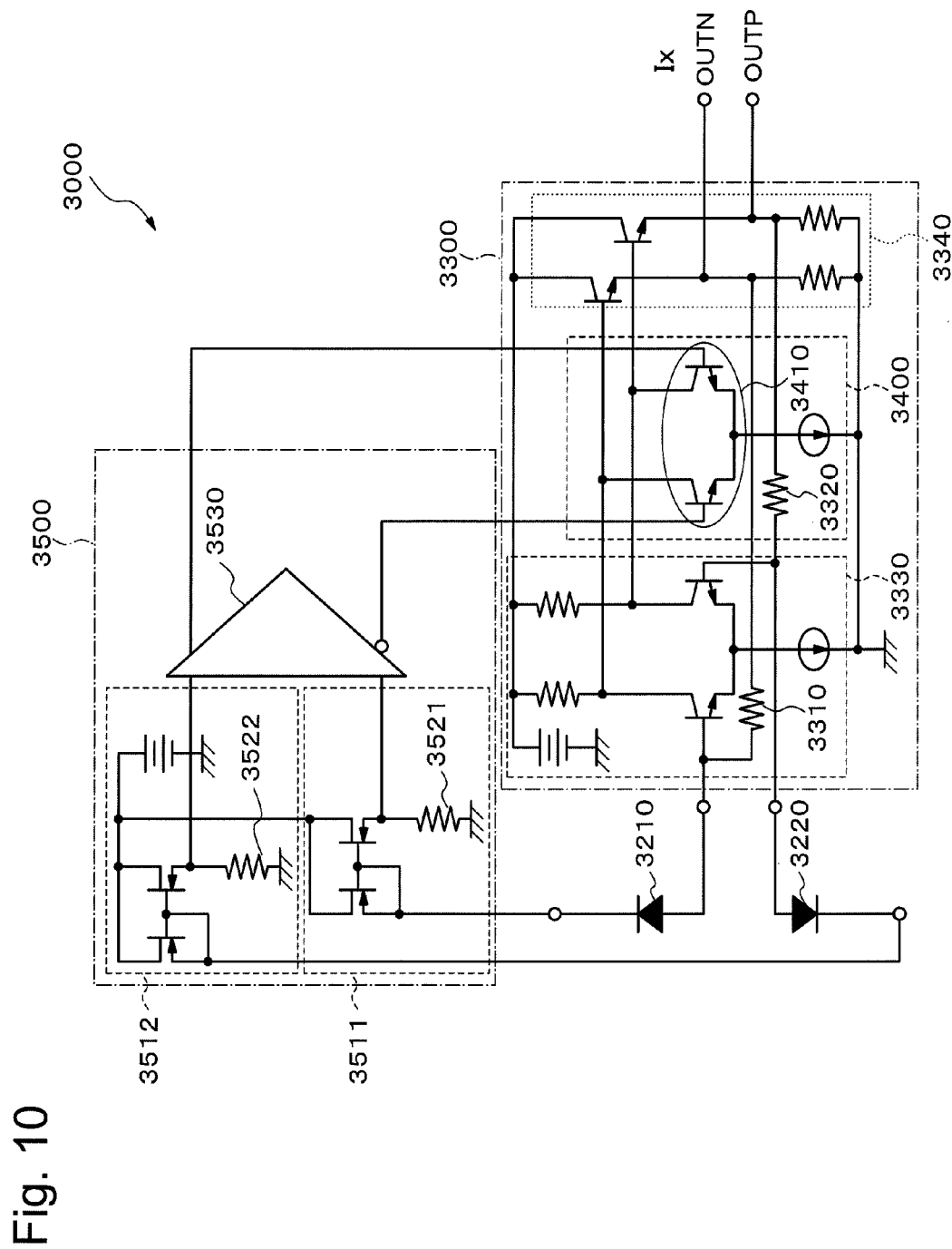
FIG. 10 is a circuit diagram showing the configuration of a coherent optical receiver according to the sixth exemplary embodiment of the present invention.

Next, the sixth exemplary embodiment of the present invention will be described. In the present exemplary embodiment, a case using the coherent detection system will be described. FIG. 10 is a circuit diagram showing the configuration of a coherent optical receiver 3000 according to the sixth exemplary embodiment of the present invention. FIG.

10 shows only a part which is related to an I channel (Ix) of one polarization (polarization X) in the coherent optical receiver. The coherent optical receiver 3000 includes a first photodiode 3210, a second photodiode 3220, a differential transimpedance amplifier 3300, a level adjustment unit 3400, and a photoelectric current detection unit 3500. Here, the coherent optical receiver 3000 composes a coherent optical reception device with the optical 90 degrees hybrid circuit 1100. In the coherent optical receiver 3000 according to the present exemplary embodiment, the configurations of the level adjustment unit 3400 and the optical current detection unit 3500 are different from those of the coherent optical receiver 2000 according to the fifth exemplary embodiment.

Each of the first photodiode 3210 and the second photodiode 3220 receives an interference optical signal which is obtained by making an optical reception signal interfere with a local oscillation light. That is to say, the first photodiode 3210 receives a first interference optical signal from the optical 90 degrees hybrid circuit 1100, and outputs a positive signal. The second photodiode 2220 receives a second interference optical signal from the optical 90 degrees hybrid circuit 1100, and outputs a complementary signal.

The photoelectric current detection unit 3500 detects photoelectric currents which flow through the first photodiode 3210 and the second photodiode 3220, respectively.

The differential transimpedance amplifier 3300 is connected to each output of the first photodiode 3210 and the second photodiode 3220, and the positive signal is inputted from the first photodiode 3210 and the complementary signal is inputted from the second photodiode 3220. The differential transimpedance amplifier 3300 composes closed feedback loops with feedback resistors 3310 and 3320.

In the present exemplary embodiment, the level adjustment unit 3400 is configured as follows. That is to say, the level adjustment unit 3400 adjusts the signal level in the closed feedback loop for the positive signal input of the differential transimpedance amplifier 3300 (feedback resister 3310) on the basis of the reversed value of the voltage generated corresponding to the photoelectric current which is generated in the first photodiode 3210 by the first interference optical signal. And, the level adjustment unit 3400 adjusts the signal level in the closed feedback loop for the complementary signal input of the differential transimpedance amplifier 3300 (feedback resister 3320) on the basis of the reversed value of the voltage generated corresponding to the photoelectric current which is generated in the second photodiode 3220 by the second interference optical signal.

Next, the configuration of the coherent optical receiver 3000 according to the present exemplary embodiment will be described more specifically. The differential transimpedance amplifier 3300 is provided with a differential amplifier 3330 which inputs the positive signal and the complementary signal, and an emitter-follower circuit 3340 (or, source-follower circuit) which is connected to the output of the differential amplifier 3330. The closed feedback loops are configured with the feedback resisters 3310 and 3320 which are connected between the output of the emitter-follower circuit 3340 and the input of the differential amplifier 3330.

The level adjustment unit 3400 is provided with a differential circuit 3410 which is connected between the output of the differential amplifier 3330 and the input of the emitter-follower circuit 3340, and adjusts the signal levels of positive and complementary signals in the closed feedback loops respectively.

The photoelectric current detection unit 3500 is provided with current mirror circuits 3511 and 3512 outputting proportional currents which are proportional to the photoelectric currents generated in the first photodiode 3210 and the second photodiode 3220 respectively. Furthermore, the photoelectric current detection unit 3500 includes resisters 3521 and 3522 as an adjustment voltage generation unit which generates an adjustment voltage according to the proportional current, and an inverter circuit 3530 outputting a level adjustment voltage which is obtained by inverting the adjustment voltage and amplifying it. And the level adjustment voltage is inputted into the differential circuit 3410 which composes the level adjustment unit 3400. That is to say, the adjustment voltage (generated in the resister 3521), which is based on the positive signal outputted by the first photodiode 3210, is inverted by the inverter circuit 3530, and is inputted into the side which is connected to a positive signal output of the differential amplifier 3330 in the differential circuit 3410 composing the level adjustment unit 3400. On the other, the adjustment voltage (generated in the resister 3522), which is based on the complementary signal outputted from the second photodiode 3220, is inverted by the inverter circuit 3530, and is inputted into the side which is connected to a complementary signal output of the differential amplifier 3330 in the differential circuit 3410 composing the level adjustment unit 3400.

Next, the operation of the coherent optical receiver 3000 according to the present exemplary embodiment will be described. If there is no difference in the intensity between the first interference optical signal received by the first photodiode 3210 and the second interference optical signal received by the second photodiode 3220, the same electric currents flow through two current mirror circuits 3511 and 3512 in the photoelectric current detection unit 3500. Therefore, the level adjustment voltages of the outputs of the inverter circuit 535 become equal, and the equal voltage is inputted into the differential circuit 3410 composing the level adjustment unit 3400. Accordingly, in this case, the positive and the complementary signals are demodulated, amplified, and outputted without any change (OUTP and OUTN).

If there is the difference in the intensity between the first optical signal and the second optical signal, the difference in the current arises between the photoelectric current flowing through the first photodiode 3210 and the photoelectric current flowing through the second photodiode 3220. At this time, the inverter circuit 3530 outputs the level adjustment voltages which are obtained by inverting the adjustment voltages corresponding to the currents which flow through the photodiodes and amplifying them. And then, the level adjustment voltages are inputted into the differential circuit 3410 composing the level adjustment unit 3400.

As mentioned above, according to the configuration of the optical receiver 3000 of the present exemplary embodiment, the inverter circuit 3530 outputs the level adjustment voltages depending on an amount to correct the difference in the intensity between the first interference optical signal and the second interference optical signal. Therefore, the difference in the intensity between the first interference optical signal and the second interference optical signal is automatically corrected. FIG. 9 shows signal waveforms after the QPSK demodulation in the case that the difference in the intensity arises between the optical signals before demodulation. In this case, a bit rate is equal to 31.78911 Gb/s. As described clearly in FIG. 9, even if the difference in the intensity arises between the optical signals before demodulation, according to the coherent optical receiver 3000 of the present exemplary embodiment, it is possible to correct automatically the difference in the received intensity and obtain the demodulated signal waveform with good quality.

While the case using the bipolar transistors is shown in FIG. 10, not limited to this, it is also possible to use field effect transistors such as the MOS type and the like.

Figure 11:
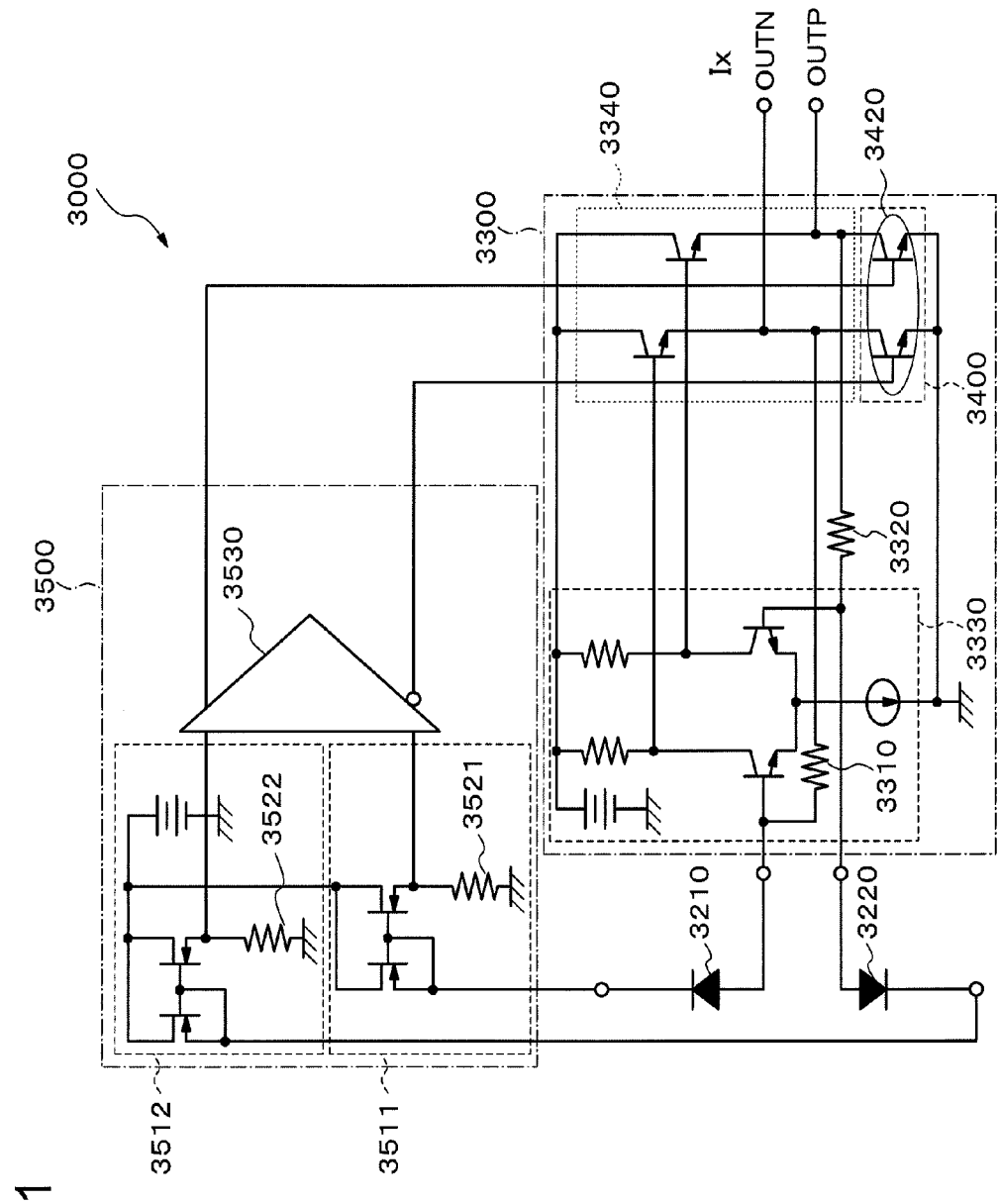
FIG. 11 is a circuit diagram showing another configuration of the coherent optical receiver according to the sixth exemplary embodiment of the present invention.
Figure 12:
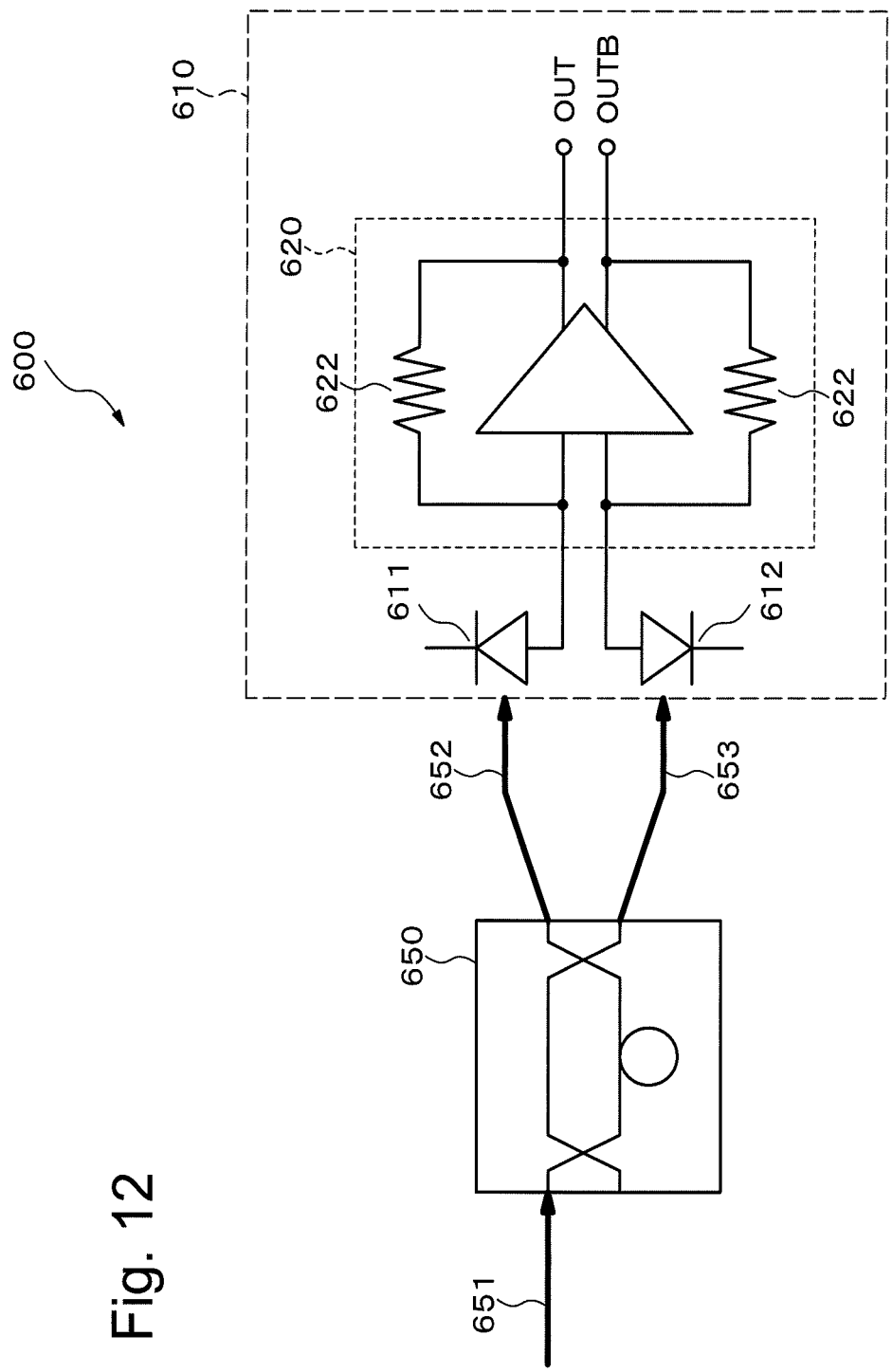
FIG. 12 is a block diagram showing the configuration of a related optical reception device.
Figure 13:
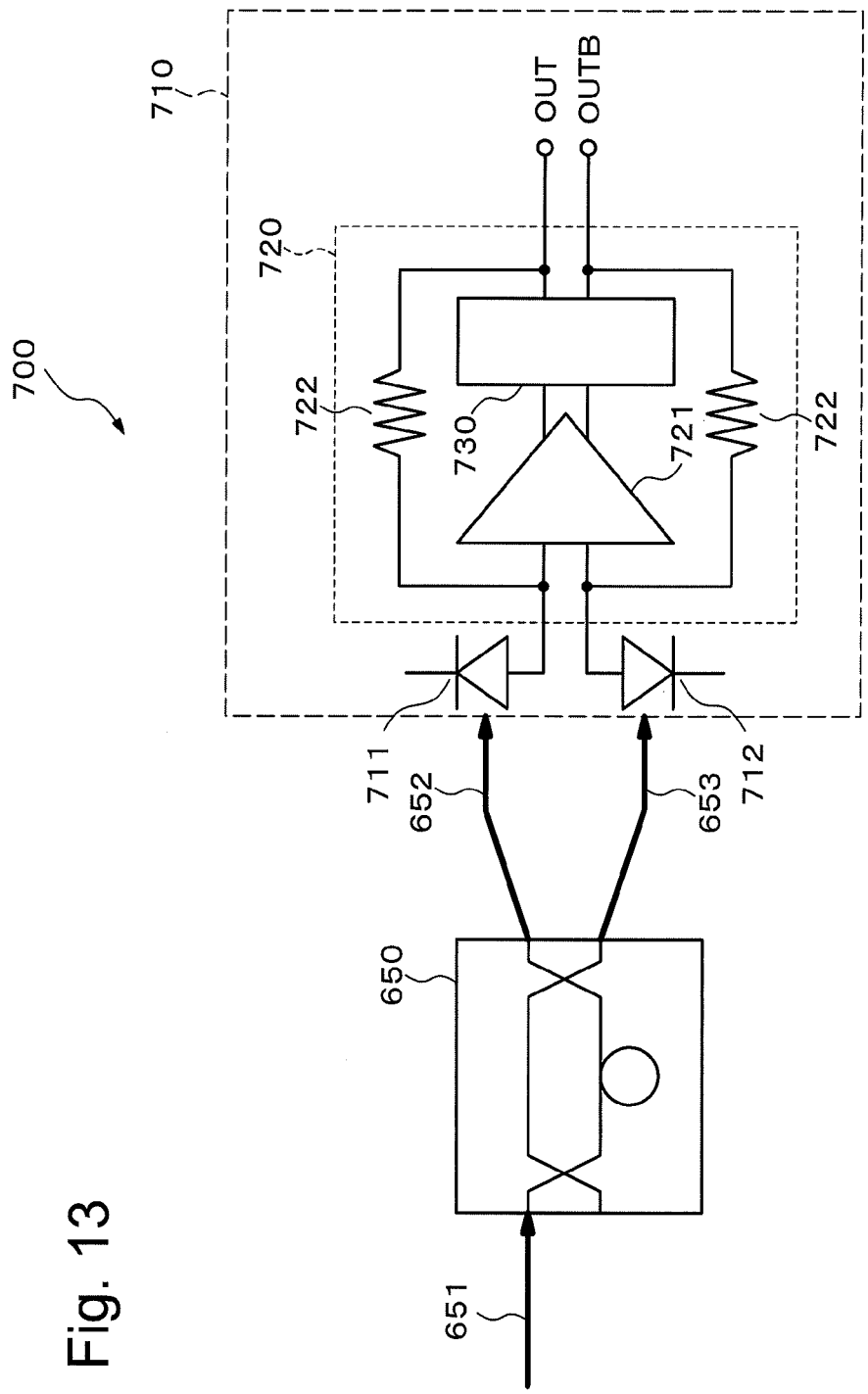
FIG. 13 is a block diagram showing the configuration of another related optical reception device.
Figure 14:
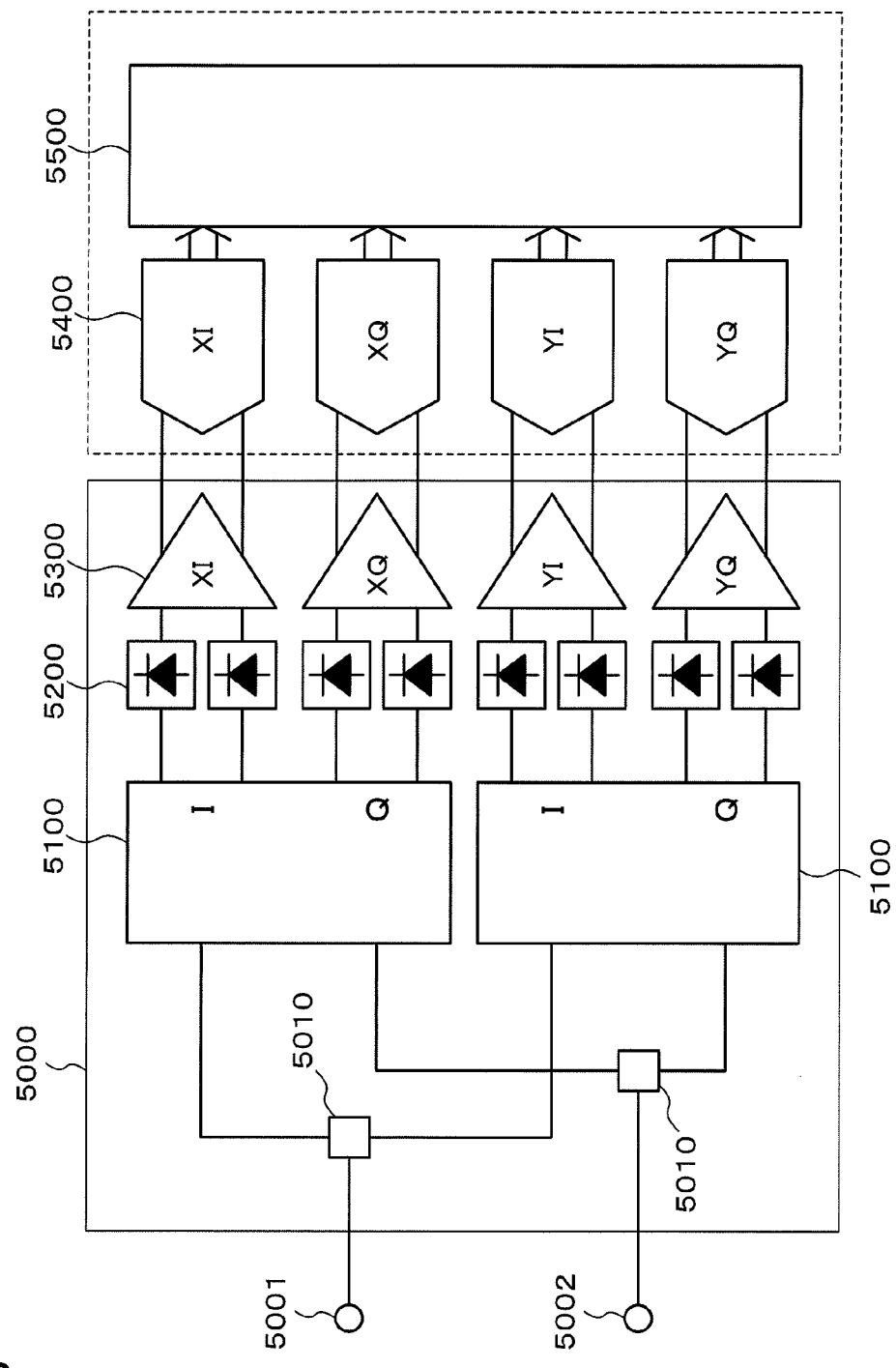
FIG. 14 is a block diagram showing the configuration of a related coherent optical reception device.

As described above, the level adjustment unit 3400 is provided with the differential circuit 3410 which is connected between the output of the differential amplifier 3330 and the input of the emitter-follower circuit 3340. However, not limited to this, it is also possible to use the level adjustment unit 3400 which is provided with a differential circuit 3420 connected to the output part of the emitter-follower circuit 3340, as shown in FIG. 11. Even in this case, the level adjustment unit 3400 can adjust the signal levels of positive and complementary signals in the closed feedback loops of the differential transimpedance amplifier 3300.

As described above, the coherent optical receiver 3000 of the present exemplary embodiment has the configuration where the photoelectric currents generated by the photodiodes are detected by the photoelectric current detection unit 3500 and are fed back to the level adjustment unit 3400. As a result, the signal levels of positive and complementary signals in two closed feedback loops of the differential transimpedance amplifier 3300 are adjusted automatically. Therefore, it becomes possible to correct automatically the difference in the intensity between two optical signals before demodulation and to amplify the signals.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2010-097624, filed on Apr. 21, 2010, the disclosure of which is incorporated herein in its entirety by reference.

DESCRIPTION OF THE CODES 100 optical reception device
200 1-bit delayed interferometer
210 optical input signal
221 first optical signal
222 second optical signal
300, 400, 500 optical receiver
301, 401, 501 first photodiode
302, 402, 502 second photodiode
310, 410, 510 differential transimpedance amplifier
311, 312, 411, 412, 511, 512 feedback resister
320, 420, 520 level adjustment unit
330, 430, 530 photoelectric current detection unit
440, 540 output amplifier
413, 513 differential amplifier
414, 514 emitter-follower circuit
415, 515 differential circuit
431, 432, 531, 532 current mirror circuit
433, 434, 533, 534 resister
535 inverter circuit
600, 700 related optical reception device
610, 710 related optical receiver
611, 612, 711, 712 photodiode (PD)
620, 720 transimpedance amplifier
622, 722 negative feedback
650 1-bit delayed interferometer
651 optical input signal
652, 653 optical signal
721 differential amplifier
730 level adjustment unit
10000 coherent optical reception device
1000, 2000 coherent optical receiver
1001 optical reception signal
1002 first local oscillation light
1100 optical 90 degrees hybrid circuit
1101 optical phase shifter
1102 optical mixer
1110 first interference optical signal
1120 second interference optical signal
1210, 2210, 3210 first photodiode
1220, 2220, 3220 second photodiode
1300, 2300, 3300 differential transimpedance amplifier
1310, 1320, 2310, 2320, 3310, 3320 feedback resister
1400, 2400, 3400 level adjustment unit
1500, 2500, 3500 photoelectric current detection unit
1600 analog-to-digital conversion unit (ADC)
1700 digital signal processing unit (DSP)
2330, 3330 differential amplifier
2340, 3340 emitter-follower circuit
2410, 3410 differential circuit
2511, 2512, 3511, 3512 current mirror circuit
2521, 2522, 3521, 3522 resister
3530 inverter circuit
5000 related coherent optical reception device
5001 optical reception signal
5002 local oscillation light
5010 polarization separation unit
5100 optical 90 degrees hybrid circuit
5200 photodiode
5300 differential transimpedance amplifier
5400 analog-to-digital conversion unit (ADC)
5500 digital signal processing unit (DSP)

The invention claimed is:

1. An optical receiver, comprising:
a first photodiode receiving a normal phase optical signal from a first output of a 1-bit delayed interferometer and outputting a positive signal;
a second photodiode receiving a reversed phase optical signal from a second output of the 1-bit delayed interferometer and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode; and
wherein the level adjustment unit adjusts the signal level on the basis of an output of the photoelectric current detection unit, wherein
the level adjustment unit adjusts a signal level in the closed feedback loop for the input of the complementary signal on the basis of the photoelectric current generated by the normal phase optical signal,
and adjusts a signal level in the closed feedback loop for the input of the positive signal on the basis of the photoelectric current generated by the reversed phase optical signal.

2. An optical reception device, comprising:
the optical receiver according to claim 1;
a 1-bit delayed interferometer; and
wherein the 1-bit delayed interferometer receives an optical modulated signal based on the differential phase shift keying modulation using the return-to-zero code, and outputs the normal phase optical signal and the reversed phase optical signal.

3. An optical receiver, comprising:
a first photodiode receiving a normal phase optical signal from a first output of a 1-bit delayed interferometer and outputting a positive signal;
a second photodiode receiving a reversed phase optical signal from a second output of the 1-bit delayed interferometer and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode; and
wherein the level adjustment unit adjusts the signal level on the basis of an output of the photoelectric current detection unit, wherein
the differential transimpedance amplifier comprises
a differential amplifier inputting the positive signal and the complementary signal, and
any one of an emitter-follower circuit and a source-follower circuit connected to an output of the differential amplifier;
the closed feedback loop comprises a feedback resister connected between an input of the differential amplifier and an output of any one of the emitter-follower circuit and the source-follower circuit;
the level adjustment unit comprises a differential circuit connected between the output of the differential amplifier and an input of any one of the emitter-follower circuit and the source-follower circuit; and
the photoelectric current detection unit comprises
a current mirror circuit outputting a proportional current proportional to the photoelectric current generated in each of the first photodiode and the second photodiode, and
an adjustment voltage generation unit generating an adjustment voltage on the basis of the proportional current, and wherein
the adjustment voltage is inputted into an input of the differential circuit in reverse between positive and complementary signals.

4. An optical receiver, comprising:
a first photodiode receiving a normal phase optical signal from a first output of a 1-bit delayed interferometer and outputting a positive signal;
a second photodiode receiving a reversed phase optical signal from a second output of the 1-bit delayed interferometer and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode; and
wherein the level adjustment unit adjusts the signal level on the basis of an output of the photoelectric current detection unit, wherein
the level adjustment unit adjusts a signal level in the closed feedback loop for the input of the positive signal on the basis of an inverted value of a voltage which is generated depending on the photoelectric current generated by the normal phase optical signal,
and adjusts a signal level in the closed feedback loop for the input of the complementary signal on the basis of an inverted value of a voltage which is generated depending on the photoelectric current generated by the reversed phase optical signal.

5. An optical receiver, comprising:
a first photodiode receiving a normal phase optical signal from a first output of a 1-bit delayed interferometer and outputting a positive signal;
a second photodiode receiving a reversed phase optical signal from a second output of the 1-bit delayed interferometer and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode; and
wherein the level adjustment unit adjusts the signal level on the basis of an output of the photoelectric current detection unit, wherein
the differential transimpedance amplifier comprises
a differential amplifier inputting the positive signal and the complementary signal, and
any one of an emitter-follower circuit and a source-follower circuit connected to an output of the differential amplifier;
the closed feedback loop comprises a feedback resister connected between an input of the differential amplifier and an output of any one of the emitter-follower circuit and the source-follower circuit;
the level adjustment unit comprises a differential circuit connected between the output of the differential amplifier and an input of any one of the emitter-follower circuit and the source-follower circuit; and
the photoelectric current detection unit comprises
a current mirror circuit outputting a proportional current proportional to the photoelectric current generated in each of the first photodiode and the second photodiode,
an adjustment voltage generation unit generating an adjustment voltage on the basis of the proportional current, and
an inverter circuit outputting a level adjustment voltage obtained by inverting the adjustment voltage and amplifying an inverted adjustment voltage, and wherein
the level adjustment voltage is inputted into the differential circuit.

6. A correction method for optical received intensity, comprising the steps of:
receiving a normal phase optical signal from a first output of a 1-bit delayed interferometer and outputting a positive signal;
receiving a reversed phase optical signal from a second output of the 1-bit delayed interferometer and outputting a complementary signal;
inputting the positive signal and the complementary signal, and outputting a positive signal voltage and a complementary signal voltage, and feeding back the positive signal voltage and the complementary signal voltage to an input side;

detecting a photoelectric current generated by each of the normal phase optical signal and the reversed phase optical signal; and adjusting a signal level in feedback on the basis of the photoelectric current, wherein, in the step of adjusting the signal level in feedback, adjusting the signal level in feedback for the input of the complementary signal on the basis of the photoelectric current generated by the normal phase optical signal; and adjusting the signal level in feedback for the input of the positive signal on the basis of the photoelectric current generated by the reversed phase optical signal.

7. A correction method for optical received intensity, comprising the steps of:

receiving a normal phase optical signal from a first output of a 1-bit delayed interferometer and outputting a positive signal;

receiving a reversed phase optical signal from a second output of the 1-bit delayed interferometer and outputting a complementary signal;

inputting the positive signal and the complementary signal, and outputting a positive signal voltage and a complementary signal voltage, and feeding back the positive signal voltage and the complementary signal voltage to an input side;

detecting a photoelectric current generated by each of the normal phase optical signal and the reversed phase optical signal; and adjusting a signal level in feedback on the basis of the photoelectric current, wherein, in the step of adjusting the signal level in feedback, adjusting the signal level in feedback for the input of the positive signal on the basis of an inverted value of a voltage which is generated depending on the photoelectric current generated by the normal phase optical signal; and adjusting the signal level in feedback for the input of the complementary signal on the basis of an inverted value of a voltage which is generated depending on the photoelectric current generated by the reversed phase optical signal.

8. A coherent optical receiver, comprising:

a first photodiode receiving a first interference optical signal obtained by making an optical reception signal interfere with a first local oscillation light whose wave length is almost the same as that of the optical reception signal, and outputting a positive signal;

a second photodiode receiving a second interference optical signal obtained by making the optical reception signal interfere with a second local oscillation light whose phase is reverse to that of the first local oscillation light, and outputting a complementary signal;

a differential transimpedance amplifier inputting the positive signal and the complementary signal and comprising a closed feedback loop for each input of the positive signal and the complementary signal;

a level adjustment unit adjusting a signal level in the closed feedback loop;

a photoelectric current detection unit detecting a photoelectric current generated in each of the first photodiode and the second photodiode, and wherein the level adjustment unit adjusts the signal level on the basis of an output of the photoelectric current detection unit, wherein the level adjustment unit adjusts a signal level in the closed feedback loop for the input of the complementary signal on the basis of the photoelectric current generated by the first interference optical signal, and adjusts a signal level in the closed feedback loop for the input of the positive signal on the basis of the photoelectric current generated by the second interference optical signal.

9. A coherent optical reception device, comprising:

the coherent optical receiver according to claim 8;

an optical 90 degrees hybrid circuit; and wherein the optical 90 degrees hybrid circuit outputs the first interference optical signal by making the optical reception signal interfere with the first local oscillation light, and outputs the second interference optical signal by making the optical reception signal interfere with the second local oscillation light.

10. A coherent optical receiver, comprising:

a first photodiode receiving a first interference optical signal obtained by making an optical reception signal interfere with a first local oscillation light whose wave length is almost the same as that of the optical reception signal, and outputting a positive signal;

a second photodiode receiving a second interference optical signal obtained by making the optical reception signal interfere with a second local oscillation light whose phase is reverse to that of the first local oscillation light, and outputting a complementary signal;

a differential transimpedance amplifier inputting the positive signal and the complementary signal and comprising a closed feedback loop for each input of the positive signal and the complementary signal;

a level adjustment unit adjusting a signal level in the closed feedback loop;

a photoelectric current detection unit detecting a photoelectric current generated in each of the first photodiode and the second photodiode, and wherein the level adjustment unit adjusts the signal level on the basis of an output of the photoelectric current detection unit, wherein the differential transimpedance amplifier comprises a differential amplifier inputting the positive signal and the complementary signal, and any one of an emitter-follower circuit and a source-follower circuit connected to an output of the differential amplifier;

the closed feedback loop comprises a feedback resister connected between an input of the differential amplifier and an output of any one of the emitter-follower circuit and the source-follower circuit;

the level adjustment unit comprises a differential circuit connected between the output of the differential amplifier and an input of any one of the emitter-follower circuit and the source-follower circuit; and the photoelectric current detection unit comprises a current mirror circuit outputting a proportional current proportional to the photoelectric current generated in each of the first photodiode and the second photodiode, and an adjustment voltage generation unit generating an adjustment voltage on the basis of the proportional current, and wherein the adjustment voltage is inputted into an input of the differential circuit in reverse between positive and complementary signals.

11. A coherent optical receiver, comprising:
a first photodiode receiving a first interference optical signal obtained by making an optical reception signal interfere with a first local oscillation light whose wave length is almost the same as that of the optical reception signal, and outputting a positive signal;
a second photodiode receiving a second interference optical signal obtained by making the optical reception signal interfere with a second local oscillation light whose phase is reverse to that of the first local oscillation light, and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode, and
wherein the level adjustment unit adjusts the signal level on the basis of an output of the photoelectric current detection unit, wherein
the level adjustment unit adjusts a signal level in the closed feedback loop for the input of the positive signal on the basis of an inverted value of a voltage which is generated depending on the photoelectric current generated by the first interference optical signal,
and adjusts a signal level in the closed feedback loop for the input of the complementary signal on the basis of an inverted value of a voltage which is generated depending on the photoelectric current generated by the second interference optical signal.

12. A coherent optical receiver, comprising:
a first photodiode receiving a first interference optical signal obtained by making an optical reception signal interfere with a first local oscillation light whose wave length is almost the same as that of the optical reception signal, and outputting a positive signal;
a second photodiode receiving a second interference optical signal obtained by making the optical reception signal interfere with a second local oscillation light whose phase is reverse to that of the first local oscillation light, and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode, and
wherein the level adjustment unit adjusts the signal level on the basis of an output of the photoelectric current detection unit, wherein
the differential transimpedance amplifier comprises
a differential amplifier inputting the positive signal and the complementary signal, and
any one of an emitter-follower circuit and a source-follower circuit connected to an output of the differential amplifier;
the closed feedback loop comprises a feedback resister connected between an input of the differential amplifier and an output of any one of the emitter-follower circuit and the source-follower circuit;
the level adjustment unit comprises a differential circuit connected between the output point of the differential amplifier and an input of any one of the emitter-follower circuit and the source-follower circuit; and
the photoelectric current detection unit comprises
a current mirror circuit outputting a proportional current proportional to the photoelectric current generated in each of the first photodiode and the second photodiode,
an adjustment voltage generation unit generating an adjustment voltage on the basis of the proportional current, and
an inverter circuit outputting a level adjustment voltage obtained by inverting the adjustment voltage and amplifying an inverted adjustment voltage, and wherein
the level adjustment voltage is inputted into the differential circuit.

13. A coherent optical receiver, comprising:
a first photodiode receiving a first interference optical signal obtained by making an optical reception signal interfere with a first local oscillation light whose wave length is almost the same as that of the optical reception signal, and outputting a positive signal;
a second photodiode receiving a second interference optical signal obtained by making the optical reception signal interfere with a second local oscillation light whose phase is reverse to that of the first local oscillation light, and outputting a complementary signal;
a differential transimpedance amplifier inputting the positive signal and the complementary signal and comprising a closed feedback loop for each input of the positive signal and the complementary signal;
a level adjustment unit adjusting a signal level in the closed feedback loop;
a photoelectric current detection unit detecting a photoelectric current generated in each of the first photodiode and the second photodiode, and
wherein the level adjustment unit adjusts the signal level on the basis of an output of the photoelectric current detection unit, wherein
the differential transimpedance amplifier comprises
a differential amplifier inputting the positive signal and the complementary signal, and
any one of an emitter-follower circuit and a source-follower circuit connected to an output of the differential amplifier;
the closed feedback loop comprises a feedback resister connected between an input of the differential amplifier and an output of any one of the emitter-follower circuit and the source-follower circuit;
the level adjustment unit comprises a differential circuit connected to an output part of any one of the emitter-follower circuit and the source-follower circuit; and
the photoelectric current detection unit comprises,
a current mirror circuit outputting a proportional current proportional to the photoelectric current generated in each of the first photodiode and the second photodiode,
an adjustment voltage generation unit generating an adjustment voltage on the basis of the proportional current, and
an inverter circuit outputting a level adjustment voltage obtained by inverting the adjustment voltage and amplifying an inverted adjustment voltage, and wherein
the level adjustment voltage is inputted into the differential circuit.

14. A correction method for coherent optical received intensity, comprising the steps of:

receiving a first interference optical signal obtained by making an optical reception signal interfere with a first local oscillation light whose wave length is almost the same as that of the optical reception signal, and outputting a positive signal converted into an electric signal;

receiving a second interference optical signal obtained by making the optical reception signal interfere with a second local oscillation light whose phase is reverse to that of the first local oscillation light, and outputting a complementary signal converted into an electric signal;

inputting the positive signal and the complementary signal, and outputting a positive signal voltage and a complementary signal voltage, and feeding back the positive signal voltage and the complementary signal voltage to an input side;

detecting a photoelectric current generated by each of the first interference optical signal and the second interference optical signal; and adjusting a signal level in feedback on the basis of the photoelectric current, wherein, in the step of adjusting the signal level in feedback, adjusting the signal level in feedback for the input of the complementary signal on the basis of the photoelectric current generated by the first interference optical signal; and adjusting the signal level in feedback for the input of the positive signal on the basis of the photoelectric current generated by the second interference optical signal.

15. A correction method for coherent optical received intensity, comprising the steps of:

receiving a first interference optical signal obtained by making an optical reception signal interfere with a first local oscillation light whose wave length is almost the same as that of the optical reception signal, and outputting a positive signal converted into an electric signal;

receiving a second interference optical signal obtained by making the optical reception signal interfere with a second local oscillation light whose phase is reverse to that of the first local oscillation light, and outputting a complementary signal converted into an electric signal;

inputting the positive signal and the complementary signal, and outputting a positive signal voltage and a complementary signal voltage, and feeding back the positive signal voltage and the complementary signal voltage to an input side;

detecting a photoelectric current generated by each of the first interference optical signal and the second interference optical signal; and adjusting a signal level in feedback on the basis of the photoelectric current, wherein, in the step of adjusting the signal level in feedback, adjusting the signal level in feedback for the input of the positive signal on the basis of an inverted value of a voltage which is generated depending on the photoelectric current generated by the first interference optical signal; and adjusting the signal level in feedback for the input of the complementary signal on the basis of an inverted value of a voltage which is generated depending on the photoelectric current generated by the second interference optical signal.

\* \* \* \* \*